United States Patent
Want et al.

(10) Patent No.: US 9,870,057 B1
(45) Date of Patent: Jan. 16, 2018

(54) GESTURE DETECTION USING AN ARRAY OF SHORT-RANGE COMMUNICATION DEVICES

(71) Applicant: Google Inc., Mountain View, CA (US)

(72) Inventors: Roy Want, Los Altos, CA (US); Yang Li, Palo Alto, CA (US); William Noah Schilit, Mountain View, CA (US)

(73) Assignee: Google LLC, Mountain View, CA (US)

( * ) Notice: Subject to any disclaimer, the term of this patent is extended or adjusted under 35 U.S.C. 154(b) by 486 days.

(21) Appl. No.: 14/165,167

(22) Filed: Jan. 27, 2014

Related U.S. Application Data

(63) Continuation of application No. 13/612,427, filed on Sep. 12, 2012, now Pat. No. 8,638,190.

(60) Provisional application No. 61/594,211, filed on Feb. 2, 2012.

(51) Int. Cl.
G06F 3/01 (2006.01)
G06F 3/0488 (2013.01)

(52) U.S. Cl.
CPC .......... *G06F 3/017* (2013.01); *G06F 3/04883* (2013.01)

(58) Field of Classification Search
CPC combination set(s) only.
See application file for complete search history.

(56) References Cited

U.S. PATENT DOCUMENTS

| | | | |
|---|---|---|---|
| 6,243,660 | B1 | 6/2001 | Hsu et al. |
| 7,145,454 | B2 | 12/2006 | Linjama et al. |
| 7,538,686 | B2 | 5/2009 | Yeh et al. |
| 7,756,467 | B2 | 7/2010 | Bent et al. |

(Continued)

FOREIGN PATENT DOCUMENTS

| | | | |
|---|---|---|---|
| WO | 2013103727 WO | A1 | 7/2013 |
| WO | 2013116757 WO | A1 | 8/2013 |

OTHER PUBLICATIONS

Ballagas, Rafael, Michael Rohs, and Jennifer G. Sheridan. "Sweep and point and shoot: phonecam-based interactions for large public displays." In CHI'05 extended abstracts on Human factors in computing systems, pp. 1200-1203. ACM, 2005.*

(Continued)

*Primary Examiner* — Yuwen Pan
*Assistant Examiner* — Zhitong Chen
(74) *Attorney, Agent, or Firm* — Shumaker & Sieffert, P.A.

(57) ABSTRACT

In general, techniques and systems for defining a gesture with a computing device using short-range communication are described. In one example, a method includes obtaining position information from an array of position devices using near-field communication (NFC) during a movement of the computing device with respect to the array, wherein the position information identifies unique positions within the array for each position device from which position information was obtained. The method may also include determining sequence information associated with the position information, wherein the sequence information is representative of an order in which the position information was obtained from each position device, and performing, by the computing device, an action based at least in part on the position information and the sequence information, wherein the position information and the sequence information are representative of a gesture input associated with the movement of the computing device.

23 Claims, 9 Drawing Sheets

(56) References Cited

U.S. PATENT DOCUMENTS

| | | | |
|---|---|---|---|
| 7,873,849 B2 | 1/2011 | Mucignat et al. | |
| 8,264,529 B2 | 9/2012 | Goulart et al. | |
| 2001/0049268 A1 | 12/2001 | Kobayashi | |
| 2003/0001018 A1 | 1/2003 | Hussey et al. | |
| 2003/0008692 A1 | 1/2003 | Phelan | |
| 2003/0046700 A1 | 3/2003 | Wilcox et al. | |
| 2003/0132974 A1 | 7/2003 | Bodin | |
| 2004/0116074 A1 | 6/2004 | Fujii et al. | |
| 2004/0146909 A1 | 7/2004 | Duong et al. | |
| 2004/0174400 A1 | 9/2004 | Herigstad et al. | |
| 2004/0194028 A1 | 9/2004 | O'Brien | |
| 2005/0030201 A1 | 2/2005 | Bridgelall | |
| 2005/0077356 A1 | 4/2005 | Takayama et al. | |
| 2005/0159823 A1 | 7/2005 | Hayes et al. | |
| 2005/0174324 A1 | 8/2005 | Liberty et al. | |
| 2006/0022800 A1 | 2/2006 | Krishna et al. | |
| 2006/0022815 A1 | 2/2006 | Fischer et al. | |
| 2006/0084409 A1 | 4/2006 | Ghadiali | |
| 2006/0092072 A1 | 5/2006 | Steiner | |
| 2006/0227365 A1 | 10/2006 | Hohensee et al. | |
| 2006/0237537 A1 | 10/2006 | Empedocles et al. | |
| 2006/0242607 A1* | 10/2006 | Hudson | G06F 3/04817 715/863 |
| 2006/0261928 A1 | 11/2006 | Solberg et al. | |
| 2007/0066323 A1 | 3/2007 | Park et al. | |
| 2007/0096876 A1 | 5/2007 | Bridgelall et al. | |
| 2007/0109124 A1 | 5/2007 | Park et al. | |
| 2007/0124503 A1* | 5/2007 | Ramos | G06F 3/017 709/248 |
| 2007/0145152 A1 | 6/2007 | Jogand-Coulomb et al. | |
| 2007/0176824 A1 | 8/2007 | Stumbo et al. | |
| 2007/0188444 A1 | 8/2007 | Vale et al. | |
| 2008/0021876 A1 | 1/2008 | Ahern et al. | |
| 2008/0042830 A1 | 2/2008 | Chakraborty et al. | |
| 2008/0076505 A1 | 3/2008 | Nguyen et al. | |
| 2008/0093447 A1* | 4/2008 | Johnson | G06K 9/228 235/383 |
| 2008/0100439 A1 | 5/2008 | Rinkes | |
| 2008/0162141 A1 | 7/2008 | Lortz | |
| 2008/0167834 A1 | 7/2008 | Herz et al. | |
| 2008/0262928 A1 | 10/2008 | Michaelis | |
| 2009/0037326 A1 | 2/2009 | Chitti et al. | |
| 2009/0044123 A1 | 2/2009 | Tilton et al. | |
| 2009/0051648 A1* | 2/2009 | Shamaie | G06F 3/0346 345/156 |
| 2009/0303004 A1 | 12/2009 | Tuttle | |
| 2010/0081375 A1 | 4/2010 | Rosenblatt et al. | |
| 2010/0161410 A1 | 6/2010 | Tulloch | |
| 2010/0178900 A1 | 7/2010 | Cheng et al. | |
| 2010/0184372 A1 | 7/2010 | Tabaaloute | |
| 2010/0214398 A1 | 8/2010 | Goulart et al. | |
| 2010/0241494 A1 | 9/2010 | Kumar et al. | |
| 2010/0280895 A1 | 11/2010 | Mottola | |
| 2010/0294840 A1 | 11/2010 | Barry | |
| 2011/0006885 A1 | 1/2011 | Park et al. | |
| 2011/0018731 A1 | 1/2011 | Linsky et al. | |
| 2011/0037609 A1 | 2/2011 | Kim et al. | |
| 2011/0083111 A1 | 4/2011 | Forutanpour et al. | |
| 2011/0095873 A1 | 4/2011 | Pratt et al. | |
| 2011/0102455 A1 | 5/2011 | Temple | |
| 2011/0106635 A1 | 5/2011 | Khan et al. | |
| 2011/0109546 A1 | 5/2011 | Milne et al. | |
| 2011/0134030 A1 | 6/2011 | Cho | |
| 2011/0185607 A1 | 8/2011 | Forster et al. | |
| 2011/0207401 A1* | 8/2011 | Han | H04B 5/0062 455/41.1 |
| 2011/0212688 A1 | 9/2011 | Griffin et al. | |
| 2011/0276511 A1 | 11/2011 | Rosenberg | |
| 2011/0320293 A1 | 12/2011 | Khan | |
| 2012/0029997 A1 | 2/2012 | Khan et al. | |
| 2012/0044059 A1 | 2/2012 | Saros et al. | |
| 2012/0045989 A1 | 2/2012 | Suumaki et al. | |
| 2012/0084302 A1 | 4/2012 | Murdock et al. | |
| 2012/0094596 A1 | 4/2012 | Tysowski | |
| 2012/0094597 A1 | 4/2012 | Tysowski | |
| 2012/0094598 A1 | 4/2012 | Tysowski | |
| 2012/0150601 A1 | 6/2012 | Fisher | |
| 2012/0167146 A1 | 6/2012 | Incorvia | |
| 2012/0183941 A1 | 7/2012 | Steinmetz | |
| 2012/0191993 A1* | 7/2012 | Drader | G06F 1/3215 713/320 |
| 2012/0198504 A1 | 8/2012 | Tabaaloute | |
| 2012/0223883 A1 | 9/2012 | Solomon | |
| 2012/0239760 A1 | 9/2012 | Sjarif et al. | |
| 2012/0242481 A1 | 9/2012 | Gemandt et al. | |
| 2012/0242846 A1 | 9/2012 | Iwase | |
| 2012/0245990 A1 | 9/2012 | Agarwal | |
| 2012/0280790 A1 | 11/2012 | Gerhardt et al. | |
| 2012/0317194 A1 | 12/2012 | Tian | |

OTHER PUBLICATIONS

Broll, Gregor, Wolfgang Reithmeier, Paul Holleis, and Matthias Wagner. "Design and evaluation of techniques for mobile interaction with dynamic NFC-displays." In Proceedings of the fifth international conference on Tangible, embedded, and embodied interaction, pp. 205-212. ACM, 2011.*

Office Action from U.S. Appl. No. 13/612,308, dated Sep. 16, 2014, 22 pp.

Response to Office Action from U.S. Appl. No. 13/612,308, filed Dec. 16, 2014 6 pp.

Final Rejection from U.S. Appl. No. 13/612,308, dated Feb. 3, 2013, 23 pp.

Response to Final Office Action from U.S. Appl. No. 13/612,308, filed Apr. 2, 2015 12 pp.

Broll et al, "Perci: Pervasive Service Interaction with the Internet of Things," Internet of Things Track, IEEE Internet Computer Society, Nov.-Dec. 2009, 36 pp.

Extended Search Report from counterpart European Application No. 13743462.7, dated Nov. 4, 2015, 6 pp.

Ballagas, "Sweep and Point & Shoot: Phonecam-Based Interactions for Large Public Displays," CHI Extended Abstracts on Human Factors in Computing Systems, Apr. 2005, pp. 1200-1203.

Broll et al., "Mobile and Physical User Interfaces for NFC-based Mobile Interaction with Multiple Tags," MobileHCI' 10, Sep. 7-10, 2010, 10 pp.

Broll et al., "Dynamic NFC-Displays as a Prototyping Platform for Direct Mobile Interactions with Public Displays," UbiComp'10, Sep. 26-29, 2010, 4 pp.

Broll et al., Design and Evaluation of Techniques for Mobile Interaction with Dynamic NFC-Displays, TEI' 11, Jan. 22-26, 2011, Funchal, Portugal, 8 pp.

Choi et al., "Beatbox Music Phone: Gesture-based Interactive Mobile Phone using a Tri-Axis Accelerometer," IEEE International Conference on Industrial Technology, Dec. 2005, pp. 97-102.

"Cirque Innovative Touch Solutions," Glidepoint NFC™, found at http://www.cirque.com/technologies/glidepointnfc.aspx, accessed on Jan. 20, 2012, 2 pp.

"Future Forecasting: Near Field Communication (NFC) in mLearning," found at https://instructionaldesignfusions.wordpress.com/tag/nfc-tags/, Dec. 26, 2010, 9 pp.

"Mobile contactless services and NFC Smart Posters to change people's daily lives," by Fred Bear, Online-News-Today, found at http://nfcdata.com/blog/2011/02/18/mobile-contactless-services-and-nfc-smart-posters-to-change-people%e2%80%99s-daily-lives/, Feb. 18, 2011, 2 pp.

"Near Field Communication," found at http://acuitydesign.eu/near-field-communication.html, accessed on Jan. 20, 2012, 1 p.

"NFC Tags and QR Codes create Smart Signs & Smart Posters," found at http://www.redirectware.com/signs-posters.htm, accessed on Sep. 9, 2011, 2 pp.

Pering et al., "Gesture Connect: Facilitating Tangible Interaction With a Flick of the Wrist," Proceedings of the 1st international conference on Tangible and embedded interaction, Feb. 2007, 4 pp.

Sanchez et al., "Touch & Control: Interacting with Services by Touching RFID Tags," Proceeding of IWRT, Dec. 2008, pp. 53-62.

U.S. Appl. No. 13/612,166, by Roy Want, filed Sep. 12, 2012.

(56) References Cited

OTHER PUBLICATIONS

Prosecution History from U.S. Appl. No. 13/611,983, dated Jan. 1, 2013 through Apr. 4, 2013, 20 pp.
Prosecution History from U.S. Appl. No. 13/612,308, dated Nov. 11, 2012 through May 8, 2013, 70 pp.
Prosecution History from U.S. Appl. No. 13/612,169, dated Nov. 26, 2012 through Apr. 17, 2013, 35 pp.
Prosecution History from U.S. Appl. No. 13/612,311, dated Nov. 28, 2012 through Apr. 8, 2013, 49 pp.
Prosecution History from U.S. Appl. No. 13/612,386, dated Nov. 23, 2012 through Dec. 12, 2013, 102 pp.
Prosecution History from U.S. Appl. No. 13/612,427 dated Dec. 11, 2012 through Sep. 20, 2013 , 54 pp.
Decision on Appeal from U.S. Appl. No. 13/612,386, dated Oct. 18, 2016, 13 pgs.

\* cited by examiner

GESTURE DETECTION USING AN ARRAY OF SHORT-RANGE COMMUNICATION DEVICES

This application is a continuation of U.S. patent application Ser. No. 13/612,427, filed Sep. 12, 2012, which claims the benefit of U.S. Provisional Application No. 61/594,211, filed Feb. 2, 2012. The entire content of application Ser. No. 13/612,427 and 61/594,211 are incorporated herein by reference.

TECHNICAL FIELD

This disclosure relates to retrieving information from short-range communication devices using a computing device.

BACKGROUND

A user may interact with applications executing on a computing device (e.g., mobile phone, tablet computer, smart phone, or the like). For instance, a user may install, view, or delete an application on a computing device.

In some instances, a user may use a mobile computing device (e.g., mobile phone, tablet computer, smart phone, or the like) to communicate with other devices or systems. For instance, a user may transmit information from the mobile device to a remote computing device.

SUMMARY

In one example, a method includes obtaining, by a computing device, position information from an array of position devices using near-field communication during a movement of the computing device with respect to the array, wherein the position information identifies unique positions within the array for each position device from which position information was obtained, determining, by the computing device, sequence information associated with the position information, wherein the sequence information is representative of an order in which the position information was obtained from each position device, and performing, by the computing device, an action based at least in part on the position information and the sequence information, wherein the position information and the sequence information are representative of a gesture input associated with the movement of the computing device.

In another example, a computer-readable storage medium is encoded with instructions that cause one or more processors of a computing device to perform operations that include obtaining position information from an array of position devices using near-field communication during a movement of the computing device with respect to the array, wherein the position information identifies unique positions within the array for each position device from which position information was obtained, determining sequence information associated with the position information, wherein the sequence information is representative of an order in which the position information was obtained from each position device, and performing an action based at least in part on the position information and the sequence information, wherein the position information and the sequence information are representative of a gesture input associated with the movement of the computing device.

In another example, a computing device includes a near-field communication module configured to obtain position information from an array of position devices using near-field communication during a movement of the computing device with respect to the array, wherein the position information identifies unique positions within the array for each position device from which position information was obtained, and at least one processor configured to determine sequence information associated with the position information, wherein the sequence information is representative of an order in which the position information was obtained from each position device, and perform an action based at least in part on the position information and the sequence information, wherein the position information and the sequence information are representative of a gesture input associated with the movement of the computing device.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
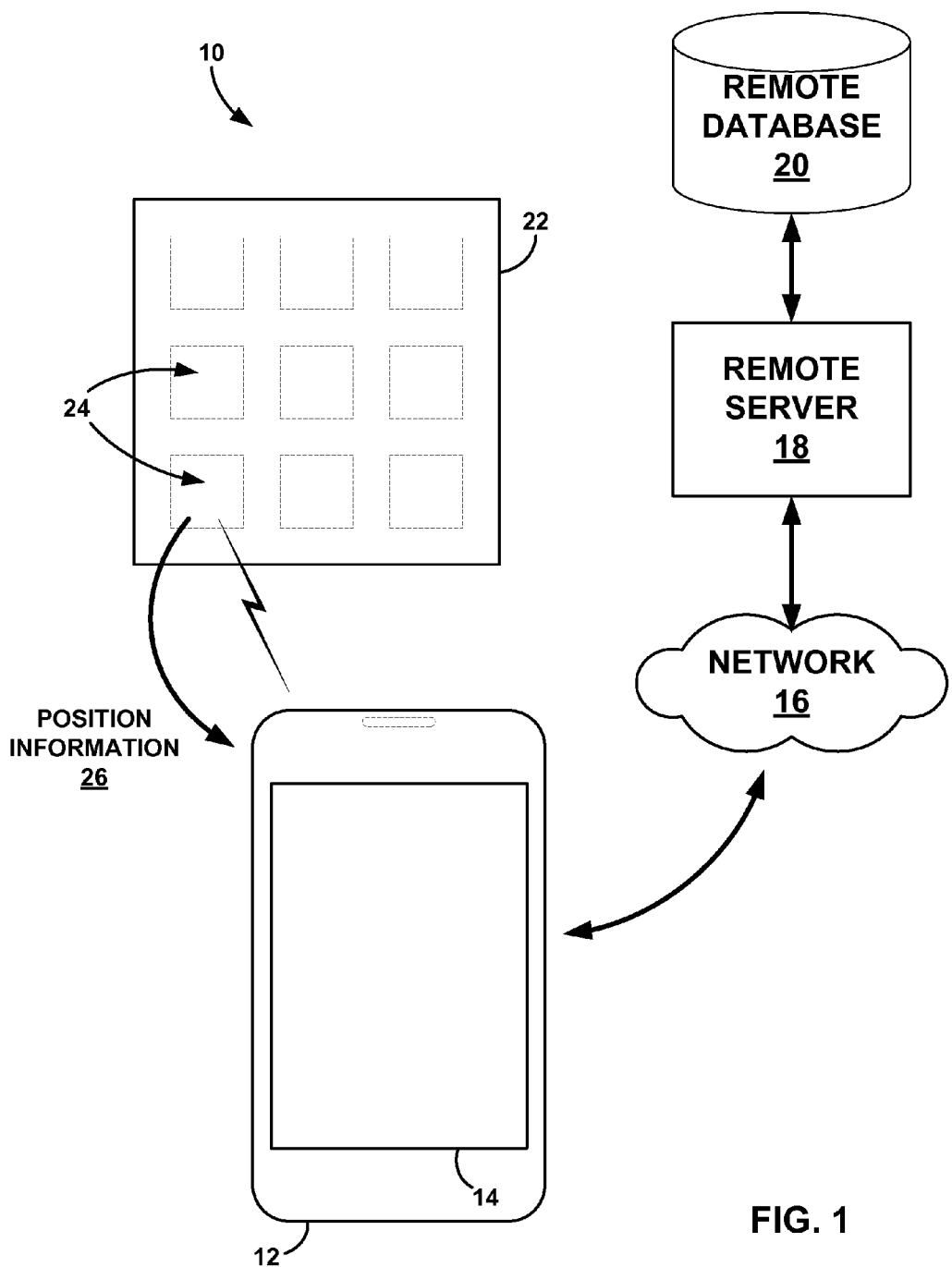
FIG. 1 is a conceptual diagram illustrating an example computing device that is configured to detect gestures using a computing device in communication with an array of position devices, in accordance with one or more aspects of the present disclosure.

In general, this disclosure is directed to techniques for detecting gestures of a computing device using short-range communication. Typically, a user may interact with a computing device (e.g., a mobile phone, tablet device, notebook computer, or desktop computer) using a user interface that accepts input from the user. Although the user may provide input via a keyboard, touchpad, or pointing device, the user may instead, in some instances, provide input to the computing device by moving the computing device through the air. These gestures made with the computing device through the air may be detected by sensors of the computing device (e.g., one or more accelerometers). However, detecting gestures in this manner may be subject to errors in the relative motion that is detected. For example, any movement of the user may also be incorporated into the movement detected for the gesture. In addition, any errors in the detected motion may be amplified with longer and/or more complicated movements of the computing device. These errors may result in the computing device incorrectly identifying the intended gesture made by the user.

Techniques of this disclosure may, in various instances, facilitate the detection of gestures made with a computing device using communication with two or more short-range communication devices (e.g., near field communication (NFC) tags, radio frequency identification (RFID) tags, or position devices as described herein). A user may place the computing device within a communication range of an array (e.g., a two-dimensional array) of short-range communication devices. The user may then move the computing device to make a desired movement or pattern over the array. As the computing device is moved over the array of short-range communication devices, the computing device may obtain position information from each of the short-range communication devices corresponding to the movement over the array. The position information may identify the relative position (e.g., the unique position) of the respective short-range communication devices within the array.

Based on the position information and the sequence in which the position information was obtained, the computing device may define the gesture input that corresponds to the movement of the computing device. The gesture input may be used to perform one or more actions (e.g., launch an application, request help, retrieve information, or even purchase a product). The computing device may compare the defined gesture input to a set of predefined gestures. Each of the predefined gestures may be associated with one or more actions. When the gesture input substantially matches one of the predefined gestures, the computing device may perform the associated action. In other examples, the computing device may transmit the position information and sequence information to a remote server (e.g., a networked device) via a network. After the remote server defines the gesture input and/or compares the gesture input to a matching predefined gesture, the computing device may receive a command or action to perform associated with the matched gesture. In some examples, the computing device may receive an indication of such command or action to perform from the remote server and use a lookup table or other reference to determine the command or action from local storage. In this manner, an accurate gesture input may be detected using short-range communication.

In some examples, one or more sensors may be used to refine the gesture input based on the position information. Since position information may, in some cases, only be used to identify straight paths between adjacent position devices of the array, the movement detected by the one or more sensors may provide a more accurate representation of the gesture input. In other examples, the computing device may capture an image associated with the array of short-range communication devices and perform an action based on the combination of the gesture input and the image. The computing device may also present graphical representations of any of this information to the user, such as the gesture input as it is created by the user or after it is defined by the computing device or remote server.

FIG. 1 is a conceptual diagram illustrating an example computing device 12 that is configured to detect gestures using computing device 12 in communication with an array 22 of position devices 24. As shown in FIG. 1, system 10 includes computing device 12, array 22, position devices 24, network 16, remote server 18, and remote database 20. Computing device 12, in some examples, is or is a part of a portable computing device (e.g., a mobile phone, a netbook, a notebook, or a tablet device). In other examples, computing device 12 may be at least a part of a digital camera, a music player, or any other device that a user may carry or move between different locations. Computing device 12 may also connect to network 16 (e.g., a wired or wireless network).

Computing device 12 may include a short-range communication module (not shown) capable of initiating wireless communication with position device 24, over a relatively short distance. For example, this short distance may be less than 10 meters, less than 1 meter, or even less than 10 centimeters. In some examples, computing device 12 may initiate communication with one of position devices 24 when computing device 12 is within, e.g., 5 centimeters or 2.5 centimeters of the position device. In other examples, computing device 12 may communicate with position devices 24 of array 22 at distances greater than 10 meters or within less than 2.5 centimeters. The short distance required for short-range communication may be selected based on the application of identification devices 24. In other words, shorter distances may be used when identification devices are closer together to so that each of the identification devices may be uniquely distinguishable from each other. In this manner, computing device 12 and/or position devices 24 may be configured to engage in communication at a particular distance based on the intended application of system 10. In one example, a user may place computing device 12 directly over or even touching array 22 such that computing device 12 may communicate with the position device at that particular location of computing device 12. If the user moves computing device 12 across array 22, computing device 12 may communicate with different position devices 24 as computing device 12 is moved to define the corresponding gesture of computing device 12.

As shown in FIG. 1, position devices 24 are arranged in array 22. Array 22 may include an image, text, or other printed material in front of or behind position devices 24. In this manner, the user may or may not be able to see position devices 24. Array 22 may be arranged with any number of position devices 24 and in any pattern, such as grids, rows, arcs, circles, diagonals, random scatter positions, and the like. Array 22 may include as few as two position devices or more than 100 position devices. Array 22 includes an example nine position devices in a three by three grid. A greater number of position devices may facilitate detection of a greater number of gesture inputs. For example, an eight by eight array of 64 position devices may be capable of differentiating between ten or more different gestures. Since each position device 24 may be relatively simple and configured to communicate with any number of computing devices, computing device 12 may be capable of establishing communication with hundreds, thousands, or even millions of different position devices.

As described herein, position devices 24 may be capable of short-range communication. One example of short-range communication is near-field communication (NFC). NFC communication can occur between two devices in different modes. For example, computing device 12 may operate in at least two different modes to communicate with position devices 24 using NFC. For example, computing device 12 and position devices 24 may be configured to operate in a passive mode and an active mode of operation. In an active mode of operation, computing device 12 may generate a first alternating magnetic field that is received by one of position devices 24 in physical proximity to computing device 12. In response, position device 24 may generate a second alternating magnetic field that is received by computing device 12. In this way, data may be communicated between computing device 12 and position device 24 such as using peer-to-peer communication. In the active mode, computing device 12 may also power or activate a passive device to retrieve data from the passive device, as further described below. In this manner, position device 24 may include passive near-field communication hardware.

In a passive mode of operation, load modulation techniques may be employed to facilitate data communication between computing device 12 and position device 24. In a passive mode, position device 24 does not actively generate an alternating magnetic field in response to the alternating magnetic field of computing device 12, but generates an alternating magnetic field as a result of the induced voltage and applied load at the receiver of position device 24. Instead, position device 24 may include electrical hardware (e.g., an NFC module) that generates a change in impedance in response to the alternating magnetic field generated by computing device 12. For example, computing device 12 may generate an alternating magnetic field that is received by position device 24. Electrical hardware in position device 24 may generate a change in impedance in response to the alternating magnetic field. The change in impedance may be detected by the NFC module of computing device 12. In this way, load modulation techniques may be used by computing device 12 to obtain position information 26 from each of position devices 24. In other words, computing device 12 may obtain position information 26 from position device 24, but position device 24 would not receive any data from computing device 12 in the passive mode. Other well-known modulation techniques including phase modulation may also be employed to facilitate data communication between computing device 12 and position device 24 in other examples.

Generally, each of position devices 24 may operate in passive mode. In passive mode, position devices 24 may be referred to as NFC tags or NFC targets. In other words, computing device 12 may include active NFC hardware and position devices 24 may include passive NFC hardware. Since a passive position devices 24 do not need a dedicated power supply, position devices 24 may be placed in a variety of locations, on any surface, or even as part of smaller items. For example, position devices 24 may be embodied as a sticker or adhesive poster that is placed on the wall of a building or on a mounting surface to which array 22 is attached. Passive position devices 24 may also be less expensive and more difficult to corrupt with computing device 12. In this manner, position devices 24 may include electrical hardware that generates a change in impedance in response to an alternating magnetic field. However, each of position devices 24 may be another computing device in other examples. For example, position devices 24 may each be a computing device that operates in a passive NFC mode and/or an active NFC mode. In other words, position devices 24 may include active NFC hardware. This active NFC hardware may be configured to emulate passive NFC hardware or participate in active near-field communication.

In an example of a passive position device 24, position device 24 may deliver position information 26 to computing device 12 in response to receiving an alternating magnetic field generated by the NFC module of computing device 12. In other words, position information 26 may be stored as data on position device 24. Upon receiving the alternating magnetic field (e.g., receiving power sufficient to transmit data) computing device 12 may receive position information 26. In this manner, position device 24 may only be capable of delivering or sending position information 26 when computing device 12 is within close physical proximity to each respective position device 24. Although the user may physically touch, bump, or tap computing device 12 to position devices 24, computing device 12 may be capable of receiving position information 26 from position devices 24 without physically touching position devices 24.

Position information 26 may include the relative position of that particular position device 24 transmitting the position information within array 22 of position devices. In other words, position information 26 may be different or unique from each of position devices 24. Since the position information for each position device 24 is unique from each other, the position information may be used to identify the particular region of array 22 over which computing device 12 has been placed by the user during the movement of the gesture. Although position information 26 may include a unique position of the respective position device 24, all position devices 24 associated with array 22 may include an indication that they are each associated with each other in array 22.

Position information 26 may include any information or data necessary to identify which regions of array 22 were passed over by computing device 12. In other words, position information 26 may identify the specific array 22 of position devices 24 and the specific position of the interrogated position device 24 with respect to other position devices of array 22. In some examples, position information 26 may be in the form of a uniform resource locator (URL) that includes a domain associated with array 22 and coordinates of the specific interrogated position device 24, for example. In another example, position information 26 may include coordinates of the position device within array 22 or a unique number or identifier that can be mapped to a specific location within array 22. Alternatively, position information 26 may include other identifying information that identifies the group or array of position devices 24 and the relative location of the particular position device 24 within the array.

In some examples, computing device 12 may utilize position information 26 obtained from each of position devices 24 during the movement of computing device 12 to identify the gesture input provided by the movement. In this manner, computing device 12 may use the obtained position information, and the sequence in which it was obtained, to define the gesture input. Computing device 12 may also compare the gesture input to one or more predetermined gestures stored in a memory of computing device 12. If the gesture input substantially matches one of the predetermined gestures, computing device 12 may perform the action or operation associated with the matched predetermined gesture. In this manner, the user may provide input to computing device 12 by merely moving computing device 12 in a certain pattern over array 22.

In other examples, remote server 18 may define the gesture input and/or compare the gesture input to predetermined gestures. For example, the locations of position devices 24 and the predetermined gestures may be stored in remote database 20 (e.g., a cloud-based storage system). Instead of using resources of computing device 12 to determine what gesture input was provided using position devices 24, computing device 12 may transmit the obtained position information 26 and sequence information to remote server 18 via network 16. Remote server 18 may then perform the calculations needed to define the gesture input based on the position information and the sequence with this the position information was obtained. The sequence may be identified by time stamps on each of the position information that was obtained, ascending numbers that identify the sequence of each detected position device, or any other method. Remote server 18 may thus construct the gesture input shape.

In addition, remote server 18 may compare the gesture input to predetermined gestures stored in remote database 20. Remote server 18 may thus retrieve a command or any other gesture information associated with the gesture that substantially matches the gesture input. Remote sever 18 may then transmit the command or gesture information back to computing device 12. In this manner, the gesture input may utilize resources from both computing device 12 and remote server 18 in some examples. By storing commands and gesture information in remote database 20, system 10 may allow any stored information to be updated when needed such that the user of computing device 12 accesses the most recent information possible. In other words, the information related to gestures may be managed in a central server (e.g., remote server 18), a central database (e.g., remote database 20), or any web-based resource.

User interface 14 may include an input device and an output device so that the user can communicate with computing device 12 in addition to using gestures. In one example, user interface 14 may be a touch screen interface. In other examples, user interface 14 may include a display and one or more buttons, pads, joysticks, mice, or any other device capable of turning user actions into electrical signals that control computing device 12. In addition, computing device 12 may include one or more microphones, speakers, cameras, or tactile feedback devices to deliver information to the user or receive information. In any example, the user may interact with user interface 14 to provide input during the movement for the gesture input. In one example, user interface 14 may present defined gesture input and/or information associated with the gesture.

In some examples, position information 26 and gesture information may be managed by a service. This service may be Internet-based and accessed by the user using an application, web browser, or any other user interface that enables the user to interact with the service. In some cases, the service may be accessed through a standalone application that is launched in response to position information 26 and operates with the operating system of computing device 12. Alternatively, the application may be a sub-routine built into an operating system running on computing device 12. In any case, computing device 12 may access the service to transmit position information and receive gesture information based on the obtained position information. The service may directly deliver the gesture information or the service may redirect a web browser of computing device 12, for example, such that computing device 12 may receive the information from a different server and/or repository. Although a standalone application may be used to access the services, the operating system may include the required functionality to directly interface with the gesture service (e.g., directly calling application programming interfaces (APIs) of the service with the operating system of computing device 12).

Computing device 12 may also include techniques to handle errors when obtaining position information 26, transmitting the obtained position information 26, defining and comparing gesture input, and/or receiving gesture information. For example, computing device 12 may not recognize or be able to interpret position information 26 received from one of position devices 24. In this event, computing device 12 may prompt the user via user interface 14 to address this error in position information 26. For example, user interface 14 may prompt the user to re-perform the movement of the gesture with computing device 12 or enable short-range communication if the feature is not enabled.

Remote server 18 and remote database 20 may each include one or more servers or databases, respectively. In this manner, remote server 18 and remote database 20 may be embodied as any hardware necessary to receive position information 26, store the predefined gestures, or transmit gesture information to computing device 12 over network 16. Remote server 18 may include one or more desktop computers, mainframes, minicomputers, or other computing devices capable of executing computer instructions and storing data. Remote database 20 may include one or more memories, repositories, hard disks, or any other data storage device. In some examples, remote database 20 may be included within remote server 18.

Remote server 18 may connect to network 16. Network 16 may be embodied as one or more of the Internet, a wireless network, a wired network, a cellular network, or a fiber optic network. In other words, network 16 may be any data communication protocol that facilitates data between two or more devices.

In some examples, remote database 20 may include Relational Database Management System (RDBMS) software. In one example, remote database 20 may be a relational database and accessed using a Structured Query Language (SQL) interface that is well known in the art. Remote database 20 may alternatively be stored on a separate networked computing device and accessed by remote server 18 through a network interface or system bus. Remote database 20 may in other examples be an Object Database Management System (ODBMS), Online Analytical Processing (OLAP) database or other suitable data management system.

Therefore, as described herein, computing device 12 and/or remote server 18 may determine the gesture input provided by a user when computing device 12 was moved within proximity of a plurality of position devices 24 of array 22. Computing device 12 may then receive information and/or perform an action associated with the determined gesture. As used herein, the term "gesture input" is referred to as the input provided to computing device 12 through movement of computing device through space and detected using short-range communication. Although the gesture input may be detected with only movement of computing device 12, computing device 12 may receive additional input that may allow the user to customize the gesture. In addition, computing device 12 may utilize a networked service (e.g., remote server 18) to contribute to the defining of the gesture input and the retrieving of an action associated with the gesture input.

The techniques, devices, and systems described herein may generally function to identify gestures made with computing device 12 and perform an action in response to identifying the gesture. In one example, computing device 12 may include an NFC module (e.g., short-range communication module 54 of FIG. 2) that is configured to obtain position information 26 from each of a plurality of position devices 24 using NFC during a movement of computing device 12 with respect to position devices 24. In other words, when computing device 12 passes in proximity of one of position devices 24, computing device 12 may obtain position information 26 from that particular position device. Position information 26 may identify unique positions of each of position device 24 within array 22 such that tracking position information 26 that is obtained may allow the movement of computing device 12 to be identified.

Computing device 12 may also include at least one processor (e.g., processors 40 of FIG. 2) that is configured to determine sequence information for the obtained position information 26. The sequence information may be representative of the order in which the position information was obtained from each of the position devices 24. Computing device 12 may then perform an action based on position information 26 and the sequence information. Since position information 26 is indicative of the path of computing device 12 during the movement with respect to array 22 and the sequence information is indicative of the order in which each position device was encountered, the position information and the sequence information may be representative of the gesture input intended by the user when moving computing device 12. In other words, computing device 12 may utilize the position information and the sequence information to detect the gesture input made by computing device 12.

In another example, a computer-readable storage medium (e.g., a memory or removable media) encoded with instructions that cause one or more processors of computing device 12 to perform operations that may include obtaining position information 26 from each of position devices 24 using NFC during a movement of computing device 12 with respect to position devices 24. As discussed herein, position information 26 may identify unique positions of each of position device 24 within array 22. The storage medium may also include instructions that cause a processor to determine sequence information for position information 26, wherein the sequence information may be representative of an order in which position information 26 was obtained from each of position devices 24 interrogated by computing device 12. The instructions may also cause the processor to perform an action based on position information 26 and the sequence information. As described herein, position information 26 and the sequence information may be representative of a gesture input made by the user with computing device 12.

As described herein, the gesture input may be detected using obtained position information 26 and the sequence with which the position information was obtained. In other words, computing device 12 and/or remote server may be able to follow the path computing device 12 made with respect to array 22 using short-range communication of position information 26. The movement of computing device 12 that is represented by the gesture input may take any number of forms. In one example, the movement of the gesture input may be a single continuous movement. In other words, computing device 12 may be continuously moving with respect to array 22 when position information 26 is obtained. In another example, the movement of computing device 12 may be discontinuous. In other words, the movement of the gesture input may be a combination of two or more continuous movements. These combinations of movements may allow the gesture input to have multiple segments and allow the user to create more complicated gesture inputs using short-range communication. The multiple segments of the movement may be defined by additional user input, stopping and starting the movement of computing device 12, removing computing device 12 from the communication range of position devices 26 (e.g., further away from array 22), or other mechanisms.

To identify the movements of computing device 12, each of position devices 24 may provide different position information 26 regarding the relative location of each specific position device to another position device within array 22. In one example, position information 26 from each of position devices 24 may include unique coordinates that identify the position of the respective position device 24 within array 22 and/or with respect to other position devices. The coordinates may identify the position of each respective position device 24 along an X and Y axis. Computing device 12 and/or remote server 18 may then interpret these coordinates to create a pattern of the identified position devices. Alternatively, the coordinates may specify a measured location in both X and Y axes among array 22 of position devices 24. In addition, instead of coordinates, position information 26 may merely identify each unique position device that is then mapped to specific locations within array 22.

Computing device 12 may obtain position information 26 when computing device 12 is placed proximate to one of the position devices 24 during the movement of the gesture within array 22. A user may hold computing device 12 in close proximity to array. Array 22 may include directions as to the distance required for short-range communication or computing device 12 may present information to the user via user interface 14, for example, that indicates when position information 26 is being obtained. The proximity between computing device 12 and each position device 24 may be a function of the antennas used for short-range communication and any materials between the antennas (e.g., printed material, paint, glass, or any other material). For position devices 24 configured to be interrogated using NFC, computing device 12 may need to be placed within 10 centimeters of each of position devices 24 in one example. In other examples, computing device 12 may need to be placed within 2.5 centimeters of each position device 24 to obtain the respective position information 26. Although not necessary, computing device 12 may also touch, bump, or otherwise contact position devices 24 to obtain position information 26 during the gesture movement.

Position devices 24 may be capable of transmitting position information 26 over greater distances, e.g., greater than 10 centimeters. However, larger distances may allow computing device 12 to interrogate multiple position devices 24 at the same time. Obtaining position information 26 from multiple position devices 24 at the same time may complicate or even prevent the determination of the gesture input based on position information 26. It may be possible in other examples to identify a specific location of computing device 12 with respect to position information obtained from multiple position devices based on signal strength of each position information 26 received by computing device 12 (e.g., the strongest signal may be from the closest position device 24 to computing device 12). Alternatively, computing device 12 may determine the center point between all position devices 24 identified by the position information 26 obtained from multiple position devices 24 when computing device 12 remains stationary at one location with respect to array 22.

The sequence information determined by computing device 12 may include any information that identifies the order in which position information 26 is obtained during the gesture movement of computing device 12 with respect to array 22. For example, the sequence information may include a time stamp added to each element of the position information that indicates when position information 26 was obtained from each of position devices 24. The time stamps may then be used to ensure correct sequence with which position information was obtained. In another example, the sequence information may include a numbered order associated with each of the obtained position information. In other words, subsequently obtained position information may increment a variable that is associated with position information 26. The position information may then be arranged in ascending order of the variable. In other examples, the sequence information may include arranging position information within an array of position information or otherwise organizing the position information in such a way that the order in which position information was obtained is stored.

After position information 26 is obtained and the sequence information is determined, the gesture input may be defined and compared to predefined gestures in order for computing device 12 to perform the associated action. In one example, computing device 12 may transmit obtained position information 26 and the sequence information for each of interrogated position devices 24 to a networked device (e.g., remote server 18) via network 16. Computing device 12 may transmit this information so that remote server 18 can define the gesture input based on the transmitted information. Remote server 18 may also compare the gesture input to predefine gestures that are each associated with one or more actions. When remote server 18 matches the gesture input to one of the predefined gestures, remote server 18 may retrieve the one or more actions associated with the matched gesture. Remote server 18 may then transmit gesture information that includes the one or more actions, or in some examples, information generated from one or more of the associated actions, to computing device 12.

Computing device 12 may then receive the gesture information from remote server 18, wherein the gesture information may be based on position information 26 and the sequence information. The gesture information may include a command associated with the matched gesture that instructs computing device 12 to perform an action (e.g., load a web page, present information to the user, purchase an item over network 16, configure computing device 12 in a certain manner, or even control another device). In some examples, the gesture information may include information that computing device 12 may present to the user via user interface 14. For example, gesture information may include a help menu, media content, passwords, contact information, or any other information retrievable or generated by remote server 18 in response to the matched gesture. In this manner, the gesture input detected by position information 26 and the sequence information may be used to perform any type of action desired by the user.

Computing device 12 may transmit all of position information 26 that has been obtained. In some examples, position information 26, and sequence information in some examples, may be transmitted in real-time as position information 26 is obtained. Alternatively, position information 26 may be transmitted in batches where each transmission includes position information from multiple position devices 24. Remote server 18 may then define the gesture input as information is received or once remote server 18 additionally receives a signal identifying the end of the gesture. Although remote sever 18 may compare the defined gesture input to predefined gestures stored in a memory (e.g., remote database 20), remote server 18 may transmit the defined gesture input back to computing device 12 such that computing device 12 may compare the gesture input and determine an action based on the comparison.

Position information 26 and sequence information may be transmitted in different forms. In one example, position information 26 and sequence information may be transmitted as batches of data that is interpreted by remote server 18. Remote server 18 may utilize a specific algorithm or software program to interpret the transmitted data. In another example, computing device 12 may generate at least one uniform resource locator (URL) representative of position information 26 from at least one of position devices 24 and at least a portion of the sequence information.

An example URL may include the domain of remote server 18, a destination of the service configured to define and compare gesture inputs, coordinates of a specific position device, and the time at which the position information with the coordinates was obtained. This example URL may take the form of: "http://www.domain.com/gestureservice/coord?x=12&y=25&T=3." The x and y coordinates (e.g., x=12 and y=25) may indicate the relative location of the position device within array 22. The time "T" (E.g., T=3) may indicate the order that the coordinates have within the gesture movement. The time may be just a number, representative of a number of seconds in the movement of computing device 12, or even a time of day (e.g., 13:48:24 or 48:24 to indicate one forty-eight and twenty four seconds P.M. In addition, time T may include fractions of a second for quickly performed gesture movements.

Computing device 12 may transmit a separate URL in response to each position information 26 obtained. In this manner, the gesture input may be determined based on multiple URLs received from computing device 12. In other examples, a URL may include position information and sequence information from multiple position devices 24 in a string format. Computing device 12 may store the position information and sequence information for later transmission. Remote server 18 may this define the gesture input from several string URLs or as few as one URL representative of all position information and sequence information for the gesture movement.

As described herein, remote server 18, computing device 12, or another device, may define and/or compare the gesture input prior to determining what action to perform. For example, computing device 12 may define the gesture input based on the unique positions of position devices 24 and the sequence information. In other words, computing device 12 may reconstruct the gesture movement of computing device 12 over array 22 using the short-range communication with position devices 24. The gesture input may be representative of the movement made by the user with computing device 12. For example, the gesture input may be a question mark, a plus sign, a minus sign, a checkmark, a number, or a letter. In other examples, the gesture input may be different shapes or symbols. Although the shape and elements of the gesture input may be used to request an action by computing device 12, the gesture input may instead be representative of a number of swipes, circles, corners, or even timing of movements in other examples. Computing device 12 may then count the number of movements within the gesture to determine what action to perform.

Computing device 12 may also include a memory that stores a plurality of predefined gestures. Each of the predefined gestures may be unique and associated with a particular action performable by computing device 12 or information to be presented to the user. Responsive to defining the gesture input, computing device 12 may compare the gesture input to the stored predefined gestures. When computing device 12 determines that the gesture input substantially matches one of the predefined gestures, computing device 12 may then perform the associated action or present the associated information. A substantially matching gesture input may be a gesture input that most closely resembles a predefined gesture. Alternatively, a substantially matching gesture input may be a gesture input that matches a shape and number of elements within a preset tolerance. Computing device 12 may utilize recognition software to perform the comparison.

Computing device 12 and remote server 18 may each contribute to the process of detecting gestures and performing an action based on the gesture. For example, either computing device 12 or remote server 18 may define the gesture input. In another example, either computing device 12 or remote server 18 may compare the gesture input to the set of predefined gestures. Computing device 12 and remote server 18 may transmit information via network 16 when performing the operations described herein. However, in some examples, computing device 12 may internally perform each of the operations needed to detect the gesture input and perform the action.

In some examples, the action may be selected based on the gesture input and additional information. For example, computing device 12 may capture an image of a printed graphic associated with array 22. The printed graphic may be printed on a substrate over position devices 26, for example. Computing device 12 may use a camera (e.g., camera 55 of FIG. 2) to capture the image. The image may relate to a certain service or product, and the gesture input may be representative of a specific action associated with the image. After the image is captured, computing device 12 may analyze the image to identify the image. Then, computing device 12 may select the action based on the gesture input and the captured image. In some examples, computing device 12 may transmit the image to remote server 18 for identification.

In other examples, computing device 12 may present an image on a display (e.g., user interface 14) prior to obtaining position information 26. This image may instruct the user as to what item any gesture made will be associated with. For example, presenting an image of a camera may indicate that help or menu gestures may be associated with cameras or a specific camera. After computing device 12 defines the gesture input, computing device 12 may select an appropriate action that is based on the gesture input and the presented image. In this manner, the same gesture input may be used to perform different actions depending upon what image is presented to the user. In some examples, the image may be selected based on the first position information 26 obtained from position devices 24 of array 22. In other words, array 22 may be configured to be used specifically for the application related to the element of the image.

Computing device 12 may also present one or more predefined gestures to the user to indicate which gestures computing device 12 would recognize. In one example, computing device 12 may present at least a subset of the predefined gestures on a display (e.g., user interface 14) in response to obtaining initial position information from a first one of position device 24 interrogated by computing device 12. Each of the predefined gestures may be associated with a respective action performable by computing device 12. In some examples, computing device 12 may also present the associated actions with the predefined gestures.

In some examples, computing device 12 may present (via a display or user interface 14) predefined gestures to the user when no match can be made with a reasonable degree of certainty. Computing device 12 may thus present possible gestures to the user when computing device 12 or remote server 18 determines that two or of the predefined gestures may correspond to obtained position information 26 and the sequence information. From the presented gestures, the user may provide input that selects the desired gesture. Computing device 12 may then perform the action associated with the selected gesture. In this manner, computing device 12 may handle errors in defining the gesture input and/or comparison to predefined gestures. In addition, computing device 12 may use this technique when the gesture movements made by the user may not have been sufficiently precise to match a predefined gesture accurately.

Although computing device 12 and/or remote server 18 may perform an action based on the gesture input and no other input from the user, the user may provide additional input in some examples. For example, computing device 12 may present the defined gesture input on a display (e.g., user interface 14), where the gesture input was based on the unique positions of position devices 24 and the sequence information when moving computing device 12 with respect to array 22. In other words, computing device 12 present the gesture input identified based on the obtained position information 26. The user may then provide a confirmation input that either confirms that the gesture input was correct or discards the gesture input. Computing device 12 may receive this confirmation input that the gesture input was intended by the user via user interface 14.

In other examples, computing device 12 may receive additional input from the user to identify which movements are gesture related movements and which movements are not intended to be included in the gesture input. For example, computing device 12 may receive an initiation input that signals to computing device 12 when to obtain position information 26 for the gesture input. Computing device 12 may receive the initiation input that commands computing device 12 to obtain position information 26. In response to receiving this initiation input, computing device 12 may begin to obtain position information 26. The initiation input may be selecting a hard or soft button of user interface 14, for example.

In some examples, providing the initiation input once may begin detection of the gesture and a subsequent input may terminate the detection of the gesture. In other examples, computing device 12 may only obtain position information 26, or apply position information 26 to a gesture input, when the initiation input is continually depressed or otherwise engaged. In other words, computing device 12 may obtain position information 26 during a time period in which computing device 12 continually receives the initiation input. Computing device 12 may thus allow the user fine control over which movements will be included when defining the gesture input.

The initiation input may also be associated with a time period that defines the amount of time available to complete the gesture movements of the gesture input. For example, computing device 12 may determine (e.g., track) a time period from when the initiation input was received. Responsive to when computing device 12 determines that the time period has expired (e.g., a determined time period has exceeded a defined threshold), computing device 12 may terminate the process of obtaining position information for the gesture input. In other words, only position information 26 obtained within the time period may be used to define the gesture input.

In one example, the initiation input may be received from a physical button of computing device 12 or a soft button (e.g., a button presented on a touch screen display of user interface 14). Alternative to receiving the input from a button, the transmit input may a "tap" or pattern of taps detected by an accelerometer that indicates the user desires that computing device 12 track the gesture movements for the gesture input. In response to receiving the initiation input, computing device 12 may obtain position information 26 and determine sequence information for the obtained position information.

As described above, computing device may receive multiple initiation inputs. These initiation inputs may, in some examples, identify breaks or discontinuities on the gesture input. For example, the user may wish to provide a gesture input in the shape of an "X" with two distinct movements for each line of the "X." In this manner, computing device 12 may obtain a first set of position information from a first subset of position devices 24 in response to receiving the first initiation input. Subsequently, computing device 12 may obtain a second set of position information from a second subset of position devices 24 in response to receiving the second initiation input. Computing device 12 or remote server 18 may then define the gesture input based on the first set of position information and the second set of position information.

In this manner, a gesture input may include a first segment discontinuous from a second segment. The first segment may be defined based on the first set of position information and the second segment may be defined based on the second set of position information. This technique may also be applied to three or more different segments of a single gesture input. In some examples, computing device 12 may be configured to identify a break in the gesture from position information obtained from non-adjacent position devices 24. The non-adjacent position information may be created by moving computing device 12 out of the communication range with position devices 24 or providing an input to stop obtaining position information during movement of computing device 12. Computing device 12 may then define the gesture input by creating a first segment from position information obtained prior to the break and creating a second segment from position information obtained after the break.

Since the gesture input may be affected by whether or not computing device 12 is close enough to array 22 to obtain position information 26 during the gesture movement, computing device 12 may provide an indication of this communication range to the user. For example, computing device 12 may determine when computing device 12 is unable to obtain position information 26 from any position devices 24 of array 22. Computing device 12 may determine this out of range condition when computing device 12 is moving and no position information is obtainable, for example. In response to determining that computing device 12 is out of range, computing device 12 may present at least one of a visual cue or an audio cue to the user. For example, computing device 12 may use a speaker to produce an audible tone or series of tones to identify that the gesture input may not be detected properly. Alternatively, or in addition, computing device 12 may present an error message on user interface 14.

In some examples, computing device 12 may detect movement of computing device 12 using one or more sensors to at least partially define the gesture input. For example, computing device 12 may use a sensor to detect movement of computing device 12 during a time period that includes a time when position information 26 was obtained. Position information 26 may provide a point by point trace of the path of computing device 12 over array 22. Therefore, the gesture input may be defined with a series of straight segments. However, computing device 12 may have been moved in a curve or other non-straight path between adjacent position devices 24. The detected movement may thus be used to generate a gesture input with a close approximation to the gesture movements of computing device 12. In one example, computing device 12 or remote server 18 may refine at least one of a shape and a length of the gesture input based on the detected movement.

The detected movement may be movement detected from an accelerometer, mercury switch, gyroscope, compass, or any other movement sensors. The accelerometer may include one or more three-axis accelerometers. In one example, computing device 12 may measure accelerations of computing device 12 after obtaining position information 26 and calculate the distance and direction computing device 12 was moved from the previously detected position device 24 based on the measured accelerations. The movements of computing device 12 may be calculated by double integration of the accelerometer measurements to identify positions occupied by computing device 12. In addition, the direction may be determined single integration of the acceleration measurements over time to generate a series of velocity vectors as computing device 12 moved in two or three dimensions. In this manner, arcs, curves, and other movements between position devices may be identified for the gesture input.

In another example, computing device 12 may detect movement of computing device 12 by capturing a plurality of images with a sensor of the computing device. The sensor may be an image sensor disposed on a surface of computing device 12 that faces array 22 (e.g., a rear facing camera). From the captured images, computing device may analyze at least two of the captured images and calculate a distance and a direction that computing device 12 was moved from the previously detected position device 24 based on a rate and direction content of an image on array 22 (e.g., a common visual feature of the array) has moved between the captured images.

Computing device 12 may, in one example, analyze the captured images for at least one common visual feature of array 22, identify at least one common feature between the images (e.g., common groups or patterns of pixels), count the number of pixel changes between each image, and estimate the movement of computing device 12 based on the number of counted pixels. In this manner, computing device 12 may calculate the distance and direction computing device 12 has moved from the distance and direction the at least one common feature has moved between the images. Computing device 12 may also employ other algorithms selected to convert feature movement between images to distance moved. These algorithms may incorporate additional data, such as focal length, to calibrate the distance per pixel calculation. In other words, larger focal lengths in the images may indicate a larger coverage length of array 22 for each pixel. The movement detected by computing device 12 may allow computing device 12 or remote server 18 to provide a more accurate movement of computing device 12 with respect to array 22 and position devices 24.

In some examples, computing device 12 may detect movement of computing device 12 in response to obtaining initial position information from a first position device 24 of array 22. In other words, computing device 12 may not even start measuring or detecting movement until computing device 12 identifies that gesture movements have begun. Alternatively, computing device 12 may receive an input from the user that indicates a gesture input will be provided. In response to receiving this input, computing device 12 may begin to detect the movement of computing device 12.

Generally, the predefined gestures stored in a memory of computing device 12 and/or remote database 20 may be generated by a program or a developer prior to use of any gesture input. For example, a software application may have been written to utilize certain predefined gestures each associated with a respective action. However, based on gesture input provided by the user, these predefined gestures may be modified or new gestures may be defined and added to the set of predefined gestures.

In one example, the user of computing device 12 may be unable to correctly make the movements for a desired predefined gesture. The user may perform the movements with incorrect curves, paths with improper lengths, or otherwise provide position information that does not substantially match one of the predefined gestures stored in memory. Computing device 12 may present possible predefined gestures to the user when the gesture input does not match any of the predefined gestures. Based on the selected gesture desired by the user, computing device 12 or remote server 18 may modify the predefined gesture to match the incorrect gesture input provided by the user. Therefore, system 10 may modify stored gestures and learn how the user will make movements for the gesture input. Instead of forcing the user to make the desired gesture, computing device 12 or remote server 18 may adapt to the user.

In another example, the user may add new gestures to the set of predefined gestures. The user may desire to add a gesture input for an action not already provided by the set of gestures. The user may navigate through a menu on user interface 14 to reach a program for entering a new gesture input or computing device 12 may present the unidentified gesture input to the user and prompt the user to add the gesture input to the set of predefined gestures. In this manner, system 10 may adapt and learn to modify the gesture interface for the user.

Array 22 may be configured with any number of position devices 24. The greater number of position devices 24 and the closer position devices 24 are to each other may increase the number of gesture inputs identifiable or recognizable by system 10. Generally, array 22 may have greater than four position devices 24, but three or fewer position devices may be possible in some examples. In one example, array 22 may include nine position devices (e.g., a three by three square grid). In other example, array 22 may include 64 position devices (e.g., an 8 by 8 square grid). An array of 64 position devices may enable system 10 to recognize at least ten different gesture inputs. In alternative examples, array 22 may include greater than 64, or even greater than 100 position devices in the array. The number of position devices 24 within array 22 may be selected based on the number of gestures that need to be identified or even space constraints for the array. The array may be placed on any surface or even supported by a post or hung from a ceiling, for example.

Various aspects of the disclosure may be operable only when the user has explicitly enabled such functionality. In addition, various aspects of the disclosure may be disabled by the user. Thus, a user may elect to prevent computing device 12 from transmitting position information 26 to remote server 18 or receive supplemental information directly from remote server 18. More generally, privacy controls may be applied to all aspects of the disclosure based on a user's privacy preferences to honor the user's privacy preferences for opting in or opting out of the functionality described in this disclosure.

Figure 2:
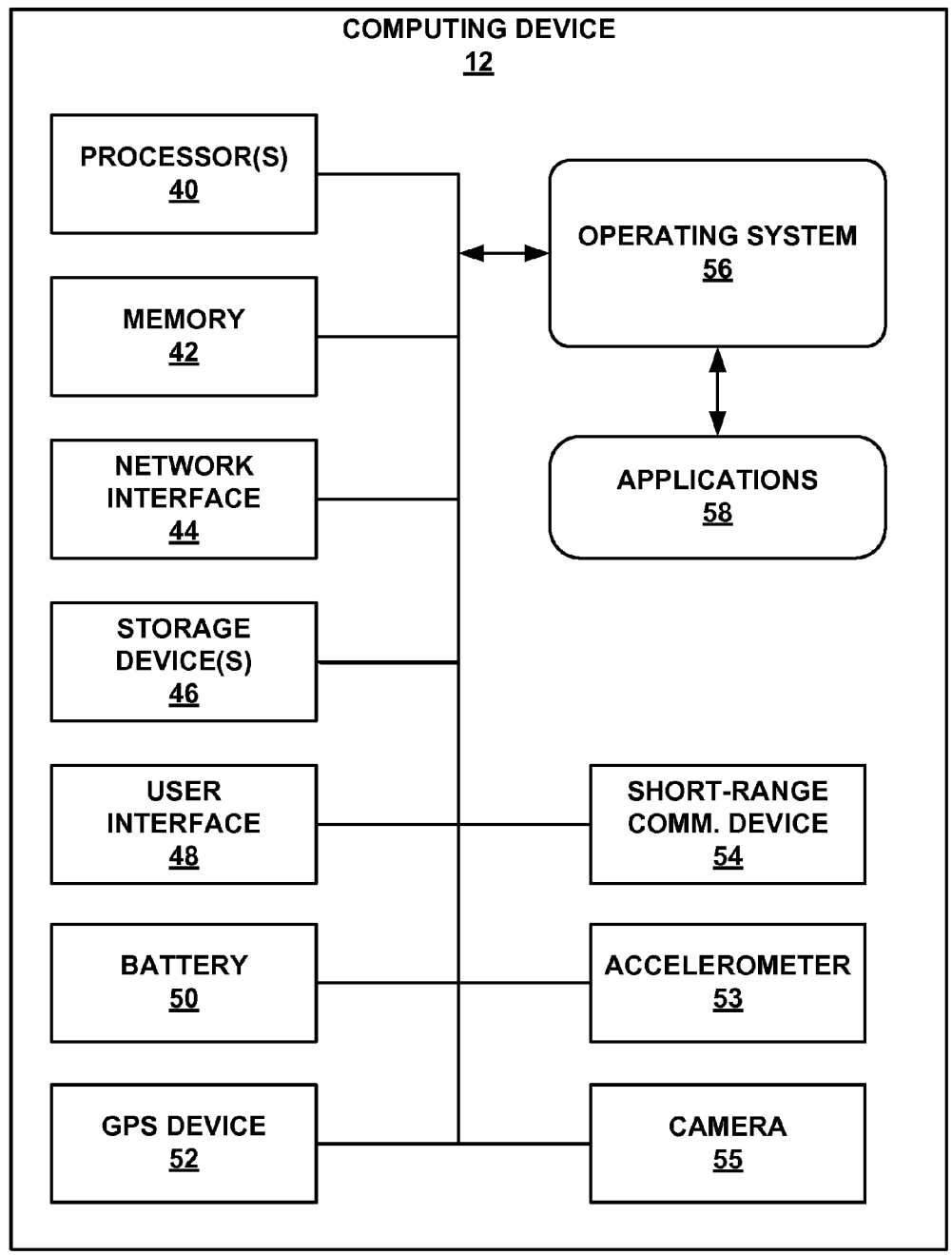
FIG. 2 is a block diagram illustrating components of one example of the computing device shown in FIG. 1, in accordance with one or more aspects of the present disclosure.

FIG. 2 is a block diagram illustrating components of one example of computing device 12 shown in FIG. 1. FIG. 2 illustrates only one particular example of computing device 12, and many other example embodiments of computing device 12 may be used in other instances. For example, computing device 12 may include additional components and run multiple different applications.

As shown in the specific example of FIG. 2, computing device 12 includes one or more processors 40, memory 42, a network interface 44, one or more storage devices 46, user interface 48, battery 50, GPS device 52, short-range communication device 54, accelerometer 53, and camera 55. Computing device 12 also includes an operating system 56, which may include modules and/or applications that are executable by processors 40 and computing device 12. Computing device 12, in one example, further includes one or more applications 58. One or more applications 58 are also executable by computing device 12. Each of components 40, 42, 44, 46, 48, 50, 52, 53, 54, 55, 56, and 58 may be interconnected (physically, communicatively, and/or operatively) for inter-component communications.

Processors 40, in one example, are configured to implement functionality and/or process instructions for execution within computing device 12. For example, processors 40 may be capable of processing instructions stored in memory 42 or instructions stored on storage devices 46. These instructions may define or otherwise control the operation of operating system 56 and applications 58.

Memory 42, in one example, is configured to store information within computing device 12 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 12 (e.g., one or more of applications 58) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. For example, memory 42 and/or storage devices 46 may store predefined gestures and/or instructions for defining the gesture input.

Computing device 12, in some examples, also includes a network interface 44. Computing device 12, in one example, utilizes network interface 44 to communicate with external devices via one or more networks, such as network 16 in FIG. 1. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 12 utilizes network interface 44 to wirelessly communicate with an external device (not shown) such as a server, mobile phone, or other networked computing device.

Computing device 12, in one example, also includes one or more user interfaces 48. User interface 48 may be an example of user interface 14 described in FIG. 1. User interface 48 may be configured to receive input from a user (e.g., tactile, audio, or video feedback). User interface 48 may include a touch-sensitive and/or a presence-sensitive screen, mouse, a keyboard, a voice responsive system, or any other type of device for detecting a command from a user. In some examples, user interface 48 includes a touch-sensitive screen, mouse, keyboard, microphone, or camera.

User interface 48 may also include, combined or separate from input devices, output devices. In this manner, user interface 48 may be configured to provide output to a user using tactile, audio, or video stimuli. In one example, user interface 48 may include a touch-sensitive screen, sound card, a video graphics adapter card, or any other type of device for converting a signal into an appropriate form understandable to humans or machines. In addition, user interface 48 may include a speaker, a cathode ray tube (CRT) monitor, a liquid crystal display (LCD), or any other type of device that can generate intelligible output to a user.

Computing device 12, in some examples, include one or more batteries 50, which may be rechargeable and provide power to computing device 12. Battery 50, in some examples, may be made from nickel-cadmium, lithium-ion, or other suitable material. In other examples, battery 50 may be a power source capable of providing stored power or voltage from another power source.

Computing device 12 may also include one of more GPS devices 52. GPS device 52 may include one or more satellite radios capable of determining the geographical location of computing device 12. Computing device 12 may utilize GPS device 52 to identify locations in which gesture inputs may be provided based on the location of array 22 and other similar arrays of position devices, for example. In some examples, GPS devices 52 may be used to aid in defining the gesture input when the gesture input is substantially large over a large area.

In addition, computing device 12 may include one or more short-range communication device 54. For example, short-range communication device 54 may be an NFC device. As described herein, short-range communication device 54 may be active hardware that is configured to obtain location information from position devices 24. In general, short-range communication device 54 may be configured to communicate wirelessly with other devices in physical proximity to short-range communication device 54 (e.g., approximately 0-10 meters). In other examples, short-range communication device 54 may be replaced with an alternative short-range communication device configured to obtain position information 26 from respective position devices 24. These alternative short-range communication devices may operate according to Bluetooth, Ultra-Wideband radio, or other similar protocols.

Computing device 12 may also include various sensors. Computing device 12 may include one or more accelerometers 53 that sense accelerations of computing device 12. Accelerometer 53 may be a three-axis accelerometer that senses accelerations in multiple dimensions. Alternatively, accelerometer 53 may include two or more single-axis accelerometers. Computing device 12 may utilize accelerometer 53 to detect movement of computing device 12 and resolve the position of computing device 12 to a higher resolution than would be possible with position devices 24 alone. In some examples, computing device 12 may also include one or more gyroscopes to sense angular acceleration or compasses to sense the movement and/or direction computing device 12.

Camera 55 may be an optical sensor that computing device 12 controls. Computing device 12 may capture images and/or video using camera 55. In some examples, camera 55 may be used to capture images associated with array 22 and/or detect movement of computing device 12 with respect to array 22. Camera 55 may be located on any surface of computing device 12 in some examples. In other examples, computing device 12 may include two or more cameras.

Computing device 12 may include operating system 56. Operating system 56, in some examples, controls the operation of components of computing device 12. For example, operating system 56, in one example, facilitates the interaction of application 58 with processors 40, memory 42, network interface 44, storage device 46, user interface 48, battery 50, GPS device 52, short-range communication device 54, accelerometer 53, and camera 55.

Application 58 may be an application configured to manage obtaining position information 26, transmitting position information 26 to remote server 18, determining sequence information, defining gesture inputs, comparing gesture inputs to predefined gestures, receiving gesture information from remote server 18, and/or presenting the gesture input or gesture information on computing device 12. Application 58 may control one or more of these features. Application 58 may thus control any aspect of the gesture process. Application 58 may be automatically launched upon detecting one of position devices 24 if application 58 is not already being executed by processors 40. Application 58 may also be used to measure and/or calculate the detected movement of computing device 12 or any other functionality described herein. Although one application 58 may manage gesture related activities, separate applications may perform one or more of these functions in other examples. Although application 58 may be software independent from operating system 56, application 58 may be a sub-routine of operating system 56 in other examples.

Computing device 12 may utilize additional applications to manage any functionality described herein with respect to system 10 or other aspects of computing device 12. Any applications (e.g., application 58) implemented within or executed by computing device 12 may be implemented or contained within, operable by, executed by, and/or be operatively/communicatively coupled to components of computing device 12 (e.g., processors 40, memory 42, network interface 44, and/or storage devices 46).

Figure 3:
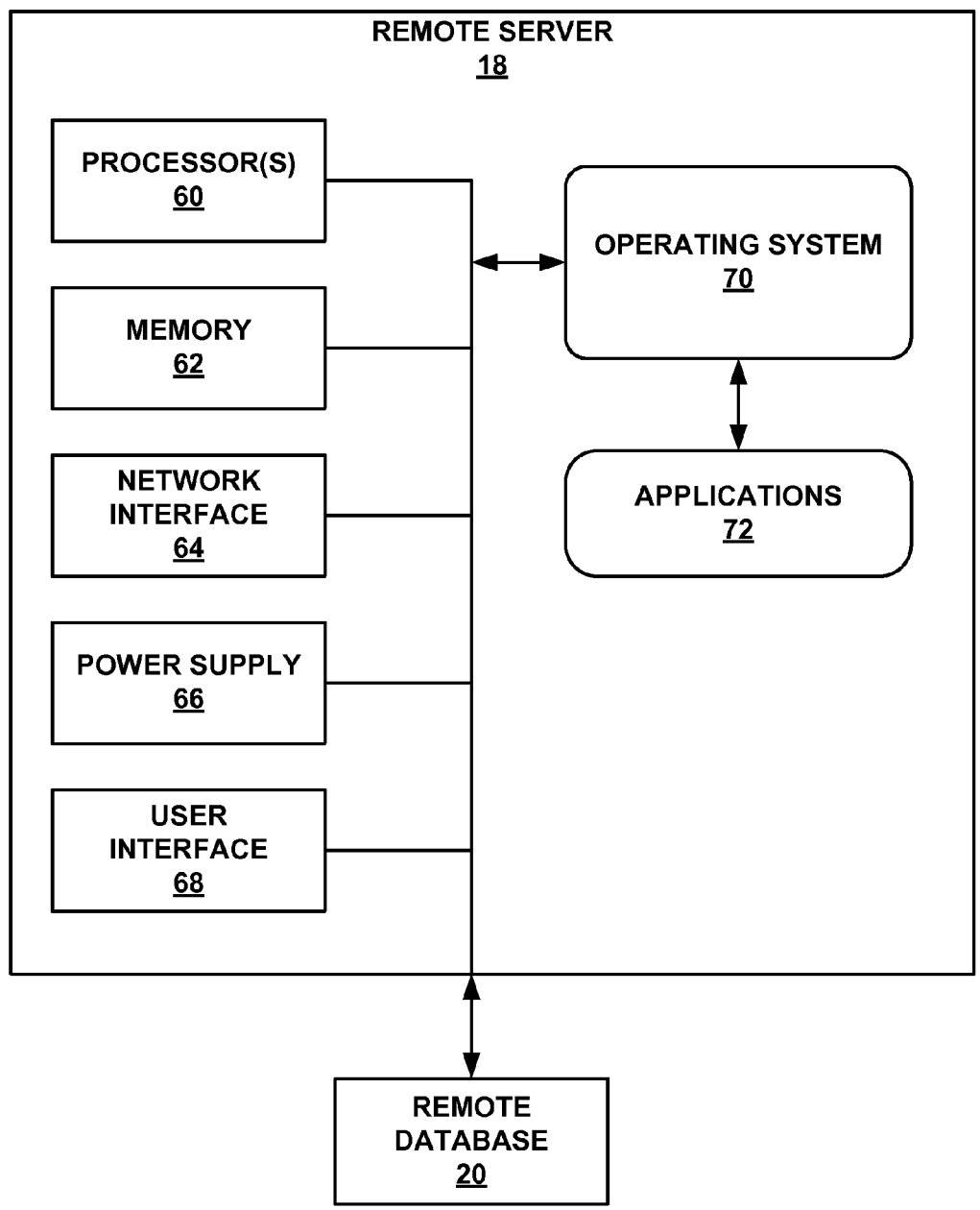
FIG. 3 is a block diagram illustrating components of one example of the remote server shown in FIG. 1, in accordance with one or more aspects of the present disclosure.

FIG. 3 is a block diagram illustrating components of one example of remote server 18 shown in FIG. 1. As shown in FIG. 3, remote server 18 may include one or more processors 60, memory 62, network interface 64, power supply 66, user interface 68, operating system 70, and applications 72. Remote server 18 may utilize remote database 20 external to a housing of remote server 18. In other examples, remote server 18 may include remote database 20 within a housing or related structure.

Remote server 18 may include one or more components similar to that of computing device 12 and configured to perform some of the same operations as comparable components of computing device 12 described in FIG. 2. As described herein, processors 60 of remote server 18 may define the gesture input based on position information 26 and sequence information received from computing device 12 via network 16. In addition, processors 60 may compare the gesture input to predefined gestures stored in remote database 20. In response to determining that the gesture input substantially matches one of the predefined gestures, processors 60 may retrieve the action or information associated with the matched gesture and transmit the action or information to computing device 12 using network interface 64 and network 16. In this manner, remote server 18 may perform functions described herein for supporting gesture related features.

Operating system 70 may control the operation of components of remote server 18. Operating system 70 may also support the execution of one or more applications 72. For example, applications 72 may perform operations such as transmitting information to computing device 12, receiving information from computing device 12, defining gesture input, and comparing gesture input to predefined gestures. Applications 72 may also support redefining the gesture input based on detected movement of computing device 12.

Figure 4:
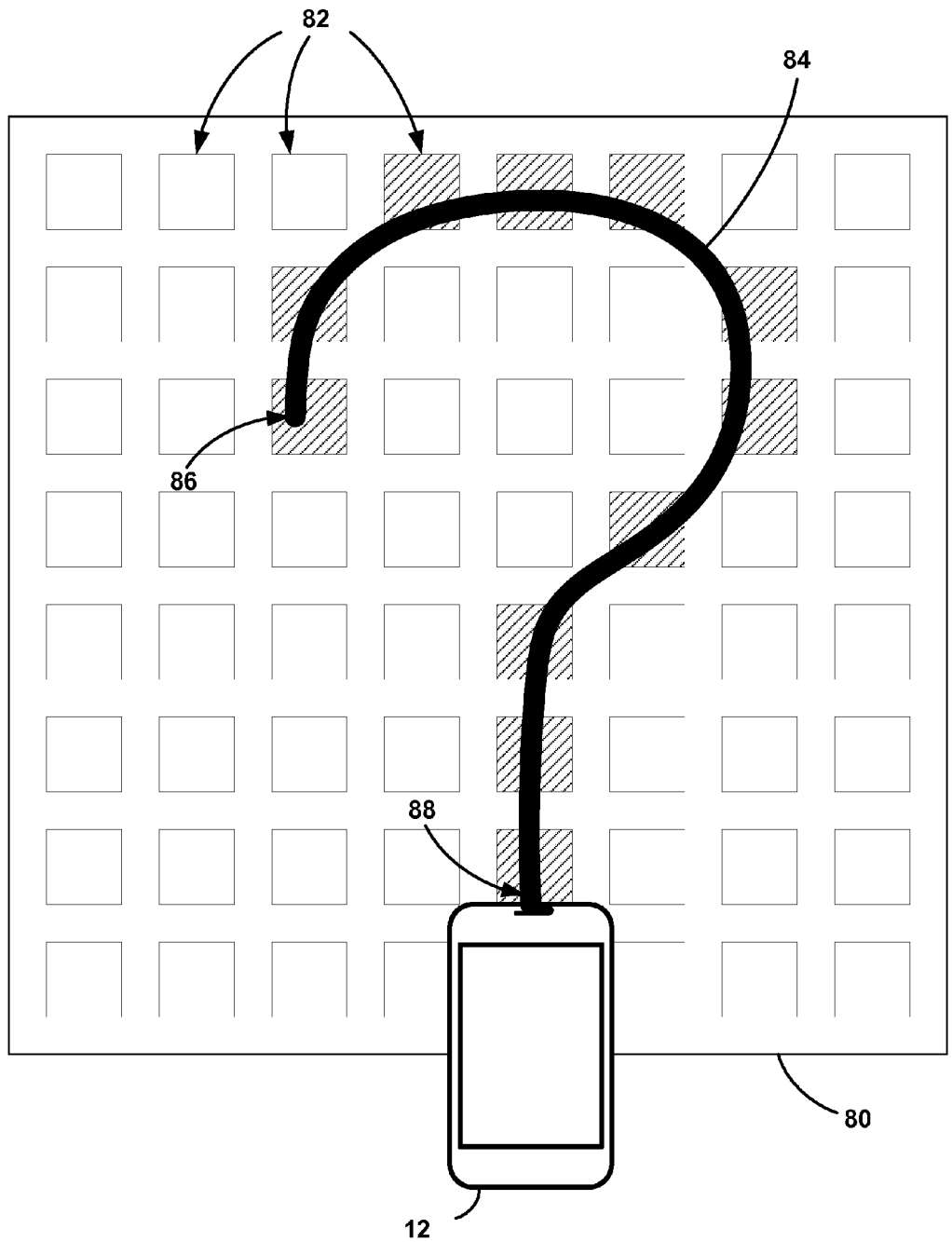
FIG. 4 is a conceptual diagram illustrating an example gesture made with a computing device over an array of position devices.

FIG. 4 is a conceptual diagram illustrating an example gesture input 84 made with computing device 12 over array 80 of position devices 82. As shown in the example of FIG. 4, computing device 12 may be moved by a user to make the shape of gesture input 84 over array 80. Array 80 includes position devices 82 arranged in an eight by eight square grid of position devices. Array 80 may be similar to array 22 of FIG. 1 and position devices 82 may be similar to position devices 24 of FIG. 1. Array 80 thus includes 64 unique position devices 82. Each of position devices 82 may store unique position information that identifies the respective location of each position device within array 80. In other examples, array 80 may include fewer or more position devices arranged in square, rectangular, or any other pattern.

To provide gesture input 84 to computing device 12, the user may create gesture movements with computing device 12 over array 80. For example, the user may initially place computing device 12 over the position device 82 corresponding to starting position 86. When computing device 12 is able to interrogate the corresponding position device 82 using short-range communication, computing device 12 may interrogate the position device and obtain position information 26. As described herein position information 26 may identify the respective position device location within array 80.

As the user moves computing device 12 in the path of gesture input 84, computing device 12 may obtain position information from each position device 82 corresponding to the path. In FIG. 4, computing device 12 may obtain position information 26 from each of position devices 82 that are shaded beneath gesture input 84. Computing device 12 may continue to obtain position information from position devices 82 until the last position device at end position 88 is reached. In this manner, the movement of computing device 12 has traced a path over array 80 in the form of position information 26 obtained from each position device along the path. Computing device 12 may also determine sequence information that identifies the order in which position information was obtained. In other words, the sequence information would identify the order as the position information starting at starting position 86, tracing the path of gesture input 84, and ending at ending position 88.

In the example of FIG. 4, gesture input 84 is shown as a question mark. However, the user may be able to create any number of different gestures using position devices 82 of array 80. For example, gesture input 84 may instead be any number, letter, symbol, or shape that would be associated with an action performable by computing device 12 and/or remote server 18. Computing device 12 may be able to identify any gesture input based on the obtained position information and the sequence with which the position information was obtained.

In some examples, the sequence information may not be necessary for defining gesture input 84. When the gesture input is a continuous shape such as the question mark of gesture input 84, computing device 12 or remote server 18 may be configured to define the gesture input by linking adjacent locations without information related to the order in which position information was obtained. However, the order for which position information was obtained may become necessary when position information is not obtained from adjacent position devices 82 or more complex gesture inputs are created with crossing paths, multiple segments, or other more complex geometries.

Figure 5A:
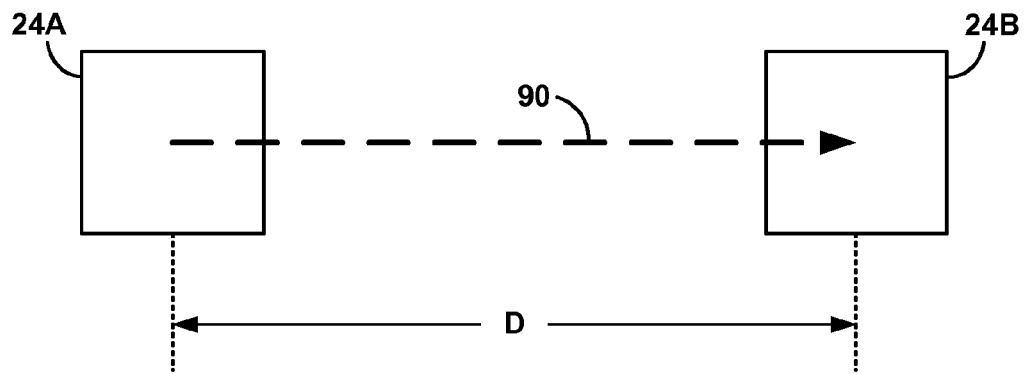
FIGS. 5A and 5B are conceptual diagrams illustrating example techniques for determining movement of a computing device between two position devices.
Figure 5B:
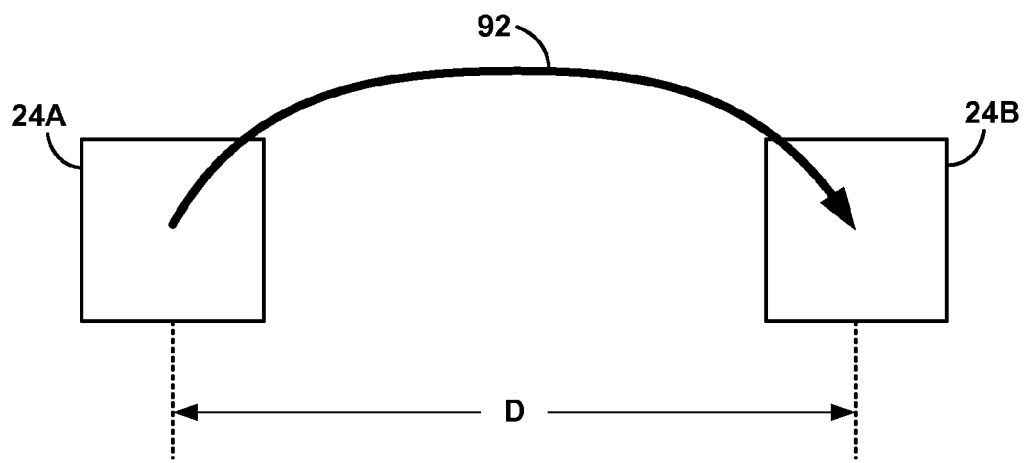

FIGS. 5A and 5B are conceptual diagrams illustrating example techniques for determining movement of computing device 12 between two position devices 24. As shown in FIG. 5A, position information 26 may be obtained from each of position devices 24A and 24B as part of a gesture input. Position information 26 may identify the respective locations (e.g., Cartesian coordinates) of position devices 24A and 24B. The distance D between position devices 24A and 24B may thus be calculated based on the known locations of position devices 24A and 24B. Therefore, the position information would indicate that computing device 12 moved in a straight path 90 from position device 24A to position device 24B. In this manner, the entire gesture input may be defined by multiple straight path segments to detect the gesture input of computing device with respect to position devices.

However, computing device 12 may not always travel in a straight path between two position devices. Computing device 12 may use one or more sensors to detect the movement of computing device and determine a more accurate gesture input. FIG. 5B illustrates an example path that computing device 12 actually moved between position devices 24A and 24B. Curved path 92 represents the actual path computing device 12 was moved during the gesture input, and curved path 92 is substantially different than straight path 90 between position devices 24A and 24B detectable by position information alone. When the distance D is greater, detected movement between position devices may refine the gesture input to a greater degree than if position devices have a smaller distance D between them. For example, the distance D between position devices may be between approximately 0.5 centimeters and 100 centimeters. More specifically, the distance between position devices may be between approximately 1.0 centimeters and 10 centimeters.

Computing device 12 may thus detect the movement of computing device 12 between position devices to generate a gesture input that provides a more accurate representation of the movements provided by the user. Computing device 12 may employ one or more accelerometers (e.g., accelerometer 53), mercury switches, gyroscopes, and/or compasses to measure the movements of computing device 12 with respect to the position devices. Using the detected movements, computing device 12 and/or remote server 18 may refine the shape and/or dimensions of the gesture input based on position information by including movements between position devices. Although the detected movement may be appropriate for small distances, such as the distances between two position devices, detected movements over larger distances may be prone to measurement error. Therefore, a combination of known positions from position information and detected movement may provide a more accurate gesture input than either method could produce alone.

Computing device 12 may begin sensing and determining movement in response to obtaining position information from a position device (e.g., position device 24A). Alternatively, computing device 12 may continuously sense and determine movement before and after obtaining position information. However, computing device 12 may only utilize the movement detected after obtaining the position information to refine the gesture input due to movement during the gesture input. In other examples, computing device 12 may change the detection rate (e.g., the rate of the sensor that senses the movement) in response to obtaining position information or after a predetermined period of time after obtaining the position information. For example, computing device 12 may increase the detection rate from a low detection to a high detection rate to provide a more accurate estimation of the position of computing device 12.

In one example, computing device 12 may include one or more accelerometers (e.g., accelerometer 53 of FIG. 2) that detect movement of computing device 12 by measuring accelerations of computing device 12 after obtaining the position information from a position device. After the accelerations are measured, computing device 12 may calculate a distance and a direction that computing device 12 was moved from the previous position device based on the measured accelerations. The accelerations may be measured with a two or three axis accelerometer or multiple accelerometers arranged orthogonally to each other. This acceleration measurement method may be referred to as an inertial measurement to interpolate the distance from a position device.

The measured accelerations (e.g., sensor values obtained from the accelerometer sensor) may be used to measure the moved distance by double integrating the measured accelerations, for example. The distance may thus be calculated periodically and added to previously measured distances or calculated at a single time determined based on stopped movement or some other detected indication that the position should be calculated. For example, the position of computing device 12 may be determined in two dimensions in a plane parallel with the visual media. The following equation may be used to determine the new position of computing device 12:

$$\text{Position}(\text{New}X, \text{New}Y) = \text{Position}(\text{Old}X + \text{Integral}(\text{Integral}(\text{Acc}X,t),t), \text{Old}Y + \text{Integral}(\text{Integral}(\text{Acc}Y,t),t)). \quad (1)$$

Equation 1 illustrates the example method for determining the new position of computing device 12 by double integration of each X and Y directional component of the sensor output. NewX is the new position in the X direction and NewY is the new position in the Y direction. Similarly, OldX is the previous position in the X direction and OldY is the previous position in the Y direction. AccX is the acceleration value in the X direction over time t and AccY is the acceleration value in the Y direction over time t. When each acceleration value is integrated twice and added to the previous, or old, position, the detected movement has been used to calculate or estimate the position of computing device 12.

Computing device 12 and/or remote server 18 may perform this calculation at a frequency sufficient to detect the movement of computing device 12 and define the gesture input. For example, the new position of computing device 12 may be calculated at a frequency between approximately 1 Hertz (Hz) and 1000 Hz. The calculated positions of computing device 12 may be used during the time in between obtaining position information. Therefore, defining the gesture input may, in some examples, include generating a best fit curve between positions identified by the obtained position information and the detected movement.

In other examples, the movement of computing device 12 may be determined using alternative methods and/or different types of sensors. For example, computing device 12 may determine movement with an optical sensor (e.g., a sensor of camera 55 of FIG. 2). Computing device 12 may capture a plurality of images with a sensor of computing device 12 and calculate a distance and a direction computing device 12 was moved from the position device based on a distance and a direction that visual content of the array (e.g., array 22) moved between the captured plurality of images. In other words, computing device 12 may still calculate movement similar to using accelerations. However, the data being used may be differences between subsequent images taken during the movement of computing device 12.

When computing device 12 is held in close proximity to array 22 (e.g., within a distance that computing device 12 can obtain position information from position devices), a camera facing array 22 may capture two or more images of images on array 22 or other visual contend of array 22 as computing device 12 is moved with respect to array 22. Computing device 12 may analyze the visual content of array 22 from each image to identify similar structures or content (e.g., a letter or a portion of an image) in each image. Because computing device 12 was moving between each captured image, the distance and direction between similar structures may correspond to the distance and direction that computing device 12 moved during the time between each image was captured.

Computing device 12 may count the number of pixels in an X direction and the number of pixels in the Y direction between the similar structures of each image. Computing device 12 may then multiply the number of pixels by an image distance calibrated based on the width or height of each pixel and the approximated distance between the camera and array 22. Computing device 12, and or remote server 18, may then apply the updated X and Y distances to the previously known position of computing device 12. The X and Y distances may be directly added as components to position components of computing device 12 or a vector may be calculated for the new X and Y distances to establish the distance and direction that computing device 12 moved from the previous position.

Using any method described herein, the detected movement of computing device 12 may be used to refine the gesture input. Computing device 12 may perform the task of using detected movement to refine the gesture input. Alternatively, computing device 12 may transmit the detected movements to remote server 18 for remote refining of the gesture input.

Figure 6:
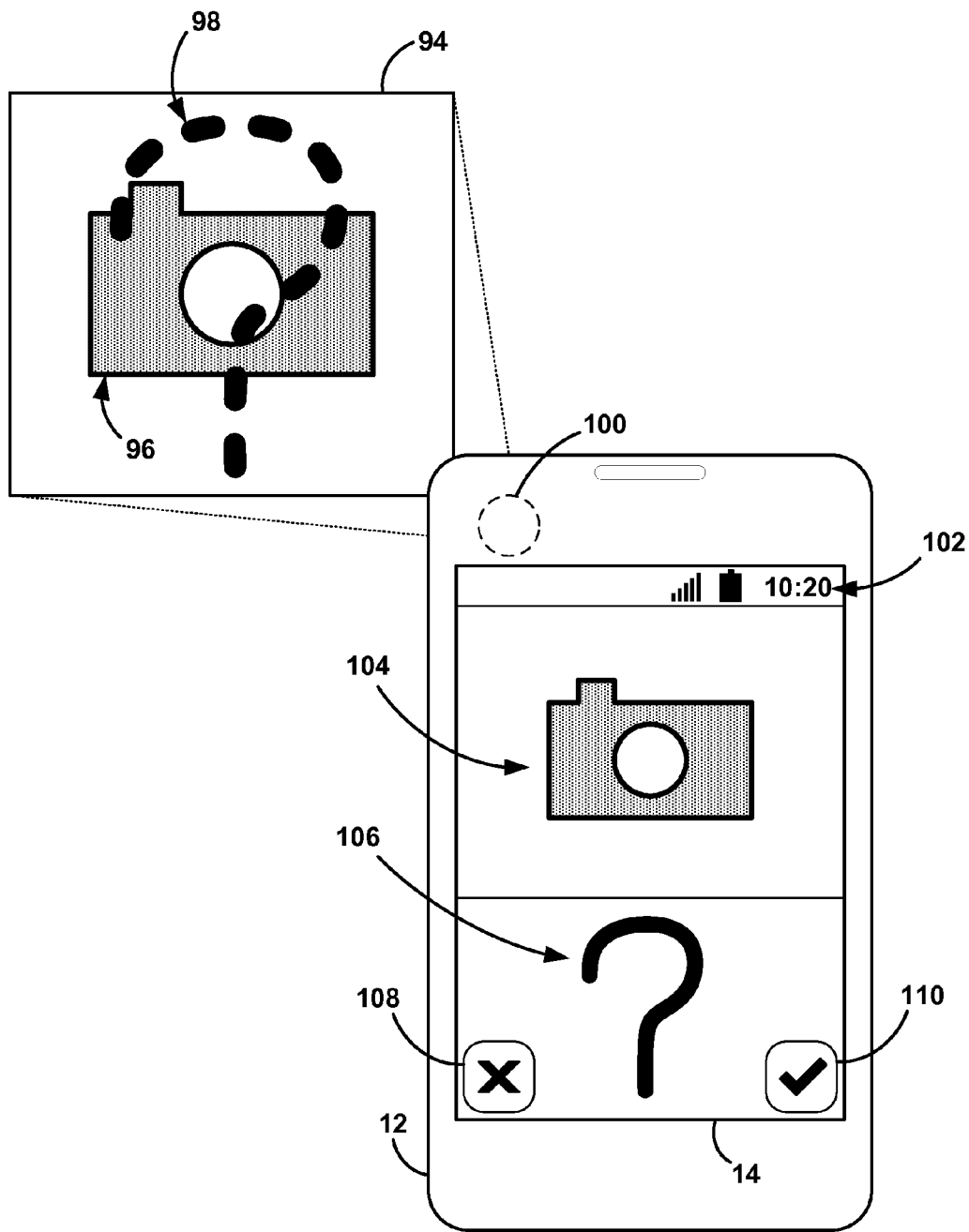
FIG. 6 is a conceptual diagram illustrating an example computing device that captures an image associated with position devices used to define a gesture input using the computing device.

FIG. 6 is a conceptual diagram illustrating example computing device 12 that captures image 96 associated with position devices 82 used to define gesture input 106 using computing device 12. As shown in the example of FIG. 6, array 94 may be similar to array 80 of FIG. 4. Array 94 may include a plurality of position devices from which computing device 12 may obtain position information for defining gesture input 98. Array 94 may include a printed medium that includes image 96. Image 96 is provided as a representation of a camera, but image 96 may be an image of any product, service, action, or other item associated with gestures. Gesture 98 may represent the path of computing device 12 over array 94 when the user creates movement to produce gesture input 106.

Computing device 12 may include user interface 14 that presents information to the user such as status bar 102 for presenting operation information to the user (e.g., network signal strength, battery status, and the time of day). Status bar 102 may also indicate when position information is being obtained. Computing device 12 may also include a camera 100 (e.g., camera 55 of FIG. 2) configured to capture images such as image 96. Camera 100 may be disposed on the rear facing surface of computing device 12 to allow camera 100 to capture images that the user is also viewing. As described herein, the user may move computing device 12 with respect to array 94 to provide a gesture input to computing device 12. The gesture input may be based on position information obtained from position devices of array 94 (not shown in FIG. 6). Using the positions identified by the obtained position information, computing device 12 may be able to determine the shape and dimensions of gesture 98 performed by the user, and define gesture input 106.

Gesture input 106 may correspond to an action associated with a matching predefined gesture. For example, providing a gesture in the shape of a question mark may prompt computing device 12 to bring up a general help menu. However, computing device 12 and/or remote server 18 may provide different actions or information based on the gesture input and images over which the gesture is made. In other words, the combination of gesture input 106 and image 104 may retrieve a different set of information or actions than just gesture input 106. Before, during, or after the user creates gesture 98 with computing device 12, camera 100 may capture image 96. For example, obtaining position information may command computing device 12 to obtain an image of array 94 and/or prompt the user to take a picture of array 94 and image 96.

Once computing device 12 has defined gesture input 106 and captured image 96, computing device 12 may present gesture input 106 and picture 104 of image 96 on user interface 14. In some examples, computing device 12 may analyze picture 104 to determine the subject matter of picture 104. In other examples, computing device 12 may transmit picture 104 to remote server 18 for analysis. In either case, the subject matter of picture 104 may be determined. The subject matter of picture 104 and gesture input 106 may then be used to retrieve actions and/or information specific to that combination of the subject matter of picture 104 and gesture input 106.

In the example of FIG. 6, the subject matter of picture 104 may be a camera. In addition, gesture input 106 may be a question mark that indicates the user desires a help menu. With the combination of the camera and the question mark, computing device 12 may present a camera help menu to the user via user interface 14. In this manner, image 96 may be used to provide more specific information or actions to the user. In some examples, the position devices of array 94 may be arranged or provided with a certain number directed to the subject matter of image 96. Computing device 12 may present both picture 104 and gesture input 106 to indicate to the user which combination of inputs are being used to retrieve information or actions for computing device 12. In some examples, computing device 12 may receive confirmation input 110 or discard input 108. Confirmation input 110 may indicate that gesture input 106 was the desired gesture made by the user. Discard input 108 may indicate that gesture input 106 was not the desired gesture of the user. Computing device 12 may proceed with performing the associated action upon receiving confirmation input 110 and terminate any action based on gesture input 106 in response to receiving discard input 108.

User interface 14 may also be formatted to facilitate use as a touch screen. In other words, all of the user inputs may be large enough for a user to touch with a single finger. Alternatively, screens of user interface 14 may be formatted to include smaller user inputs when a pointing device may be used to select input buttons.

Figure 7:
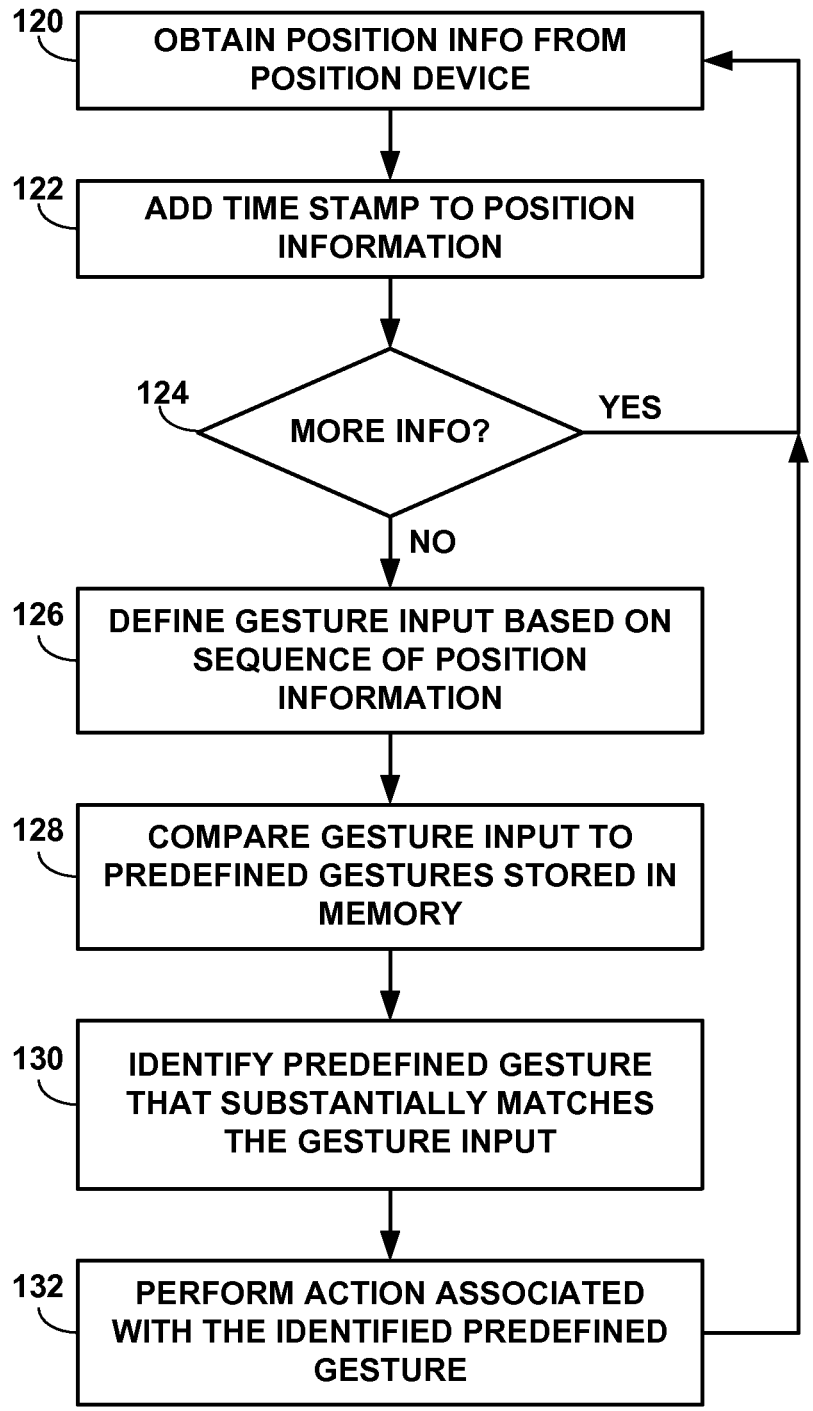
FIG. 7 is a flow diagram illustrating an example process that may be performed by a computing device to perform an action from a gesture input detected using short-range communication.

FIG. 7 is a flow diagram illustrating an example process that may be performed by a computing device (e.g., computing device 12) to perform an action from a gesture input detected using short-range communication (e.g., position information 26 from position devices 24). The process of FIG. 7 will be described below with respect to processor 40, but other processors, modules, applications, or any combination thereof, may perform the acts attributed to processor 40. Using short-range communication device 54 (e.g., an NFC device), processor 40 may obtain position information 26 from a position device 24 when computing device 12 is moved in a gesture proximate to array 22 (120).

In response to obtaining position information 26, processor 40 may add a time stamp to the position information as at least a portion of sequence information (122). In some examples, the time stamp may be used to determine the order in which position information is obtained. Alternatively, an incrementing numeral may be used to track the order of position information (and position devices) of the gesture made by the user. If processor 40 identifies that there is more position information 26 from another position device ("YES" branch of block 124), processor may again obtain position information (120). Processor 40 may determine that there is more position information by detecting another position device, detecting that computing device 12 is still moving, or continuing until a time period for obtaining information elapses.

In response to determining that there is no more position information to obtain ("NO" branch of block 124), processor 40 may define the gesture input based on the obtained position information and the sequence information (126). Processor 40 may analyze the coordinates of all of the position information and assemble the coordinates in the order identified by the sequence information. Processor 40 may then compare the defined gesture input to predefined gestures stored in a memory of computing device 12 (128). In other examples, processor 40 may retrieve predefined gestures from remote database 20 for comparison. Processor 40 may then identify the predefined gesture that substantially matches the gesture input (130). A substantial match may be the predefined gesture determined to be closest to the gesture input or the predefined gesture that is within a tolerance level of the gesture input.

Each of the predefined gestures may be associated with an action, such as retrieving certain information, opening an application, purchasing an item, changing a media player to a different song, or any other action or operation performable by computing device 12. In response to identifying the matching predefined gesture, processor 40 may perform or command another component of computing device 12 to perform the action associated with the predefined gesture that matches the gesture input (132). Computing device 12 may then obtain position information if additional position devices are interrogated during another gesture over array 22 (120). In this manner, the user may move computing device 12 with respect to a plurality of short-range communication devices (e.g., an array of devices) to control computing device 12.

Figure 8:
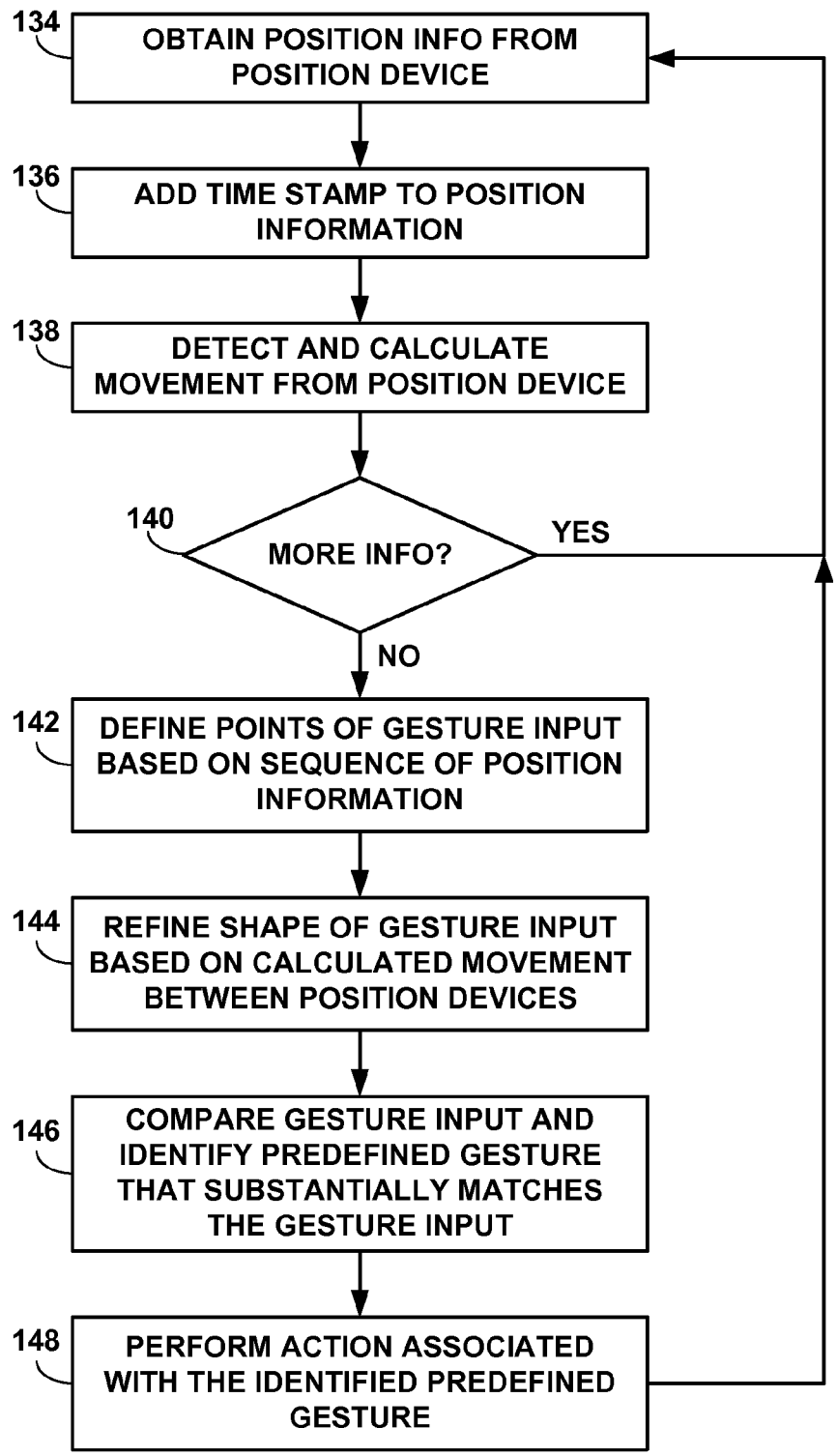
FIG. 8 is a flow diagram illustrating an example process that may be performed by a computing device to define a gesture input using short-range communication and detected movement of the computing device.

FIG. 8 is a flow diagram illustrating an example process that may be performed by a computing device (e.g., computing device 12) to define a gesture input using short-range communication (e.g., position information 26 from position devices 24) and detected movement of the computing device. The process of FIG. 8 will be described below with respect to processor 40, but other processors, modules, applications, or any combination thereof, may perform the acts attributed to processor 40. The example process of FIG. 8 may be similar to the process of FIG. 7, but detected movement of computing device 12 may be used to refine the gesture input.

Using short-range communication device 54 (e.g., an NFC device), processor 40 may obtain position information 26 from a position device 24 when computing device 12 is moved in a gesture proximate to array 22 (134). In response to obtaining position information 26, processor 40 may add a time stamp to the position information as at least a portion of sequence information (136). Alternatively, an incrementing numeral may be used to track the order of position information (and position devices) of the gesture made by the user. Processor 40 may also use one or more sensors, such as accelerometer 53, to detect and calculate movement of computing device 12 from the previous position device (138). If processor 40 identifies that there is more position information 26 from another position device ("YES" branch of block 140), processor may again obtain position information (134). Processor 40 may determine that there is more position information by detecting another position device, detecting that computing device 12 is still moving, or continuing until a time period for obtaining information elapses.

In response to determining that there is no more position information to obtain ("NO" branch of block 140), processor 40 may define points of the gesture input based on the obtained position information and the sequence information (142). Processor 40 may analyze the coordinates of all of the position information and assemble the coordinates into points in space in the order identified by the sequence information. Processor 40 may refine the shape of the gesture input based on the calculated movement between each of the coordinates from the respective position devices (144). For example, processor 40 may add additional points or shaped lines that correlate to the calculated movement. The refined shape of the gesture input may then be a closer approximation to the actual movement of computing device 12 with respect to position devices 24 and array 22.

Using the refined shape of the gesture input, processor 40 may compare the gesture input to predefined gestures stored in a memory of computing device 12 and identify the gesture that substantially matches the gesture input (146). In other examples, processor 40 may retrieve predefined gestures from remote database 20 for comparison or even transmit the gesture input to remote server 18 for the comparison operation. As described herein, a substantial match may be the predefined gesture determined to be closest to the gesture input or the predefined gesture that is within a tolerance level of the gesture input. In response to identifying the matching predefined gesture, processor 40 may perform or command another component of computing device 12 to perform the action associated with the predefined gesture that matches the gesture input (148). Processor 40 may continue to obtain position information for subsequent gesture inputs (134).

Figure 9:
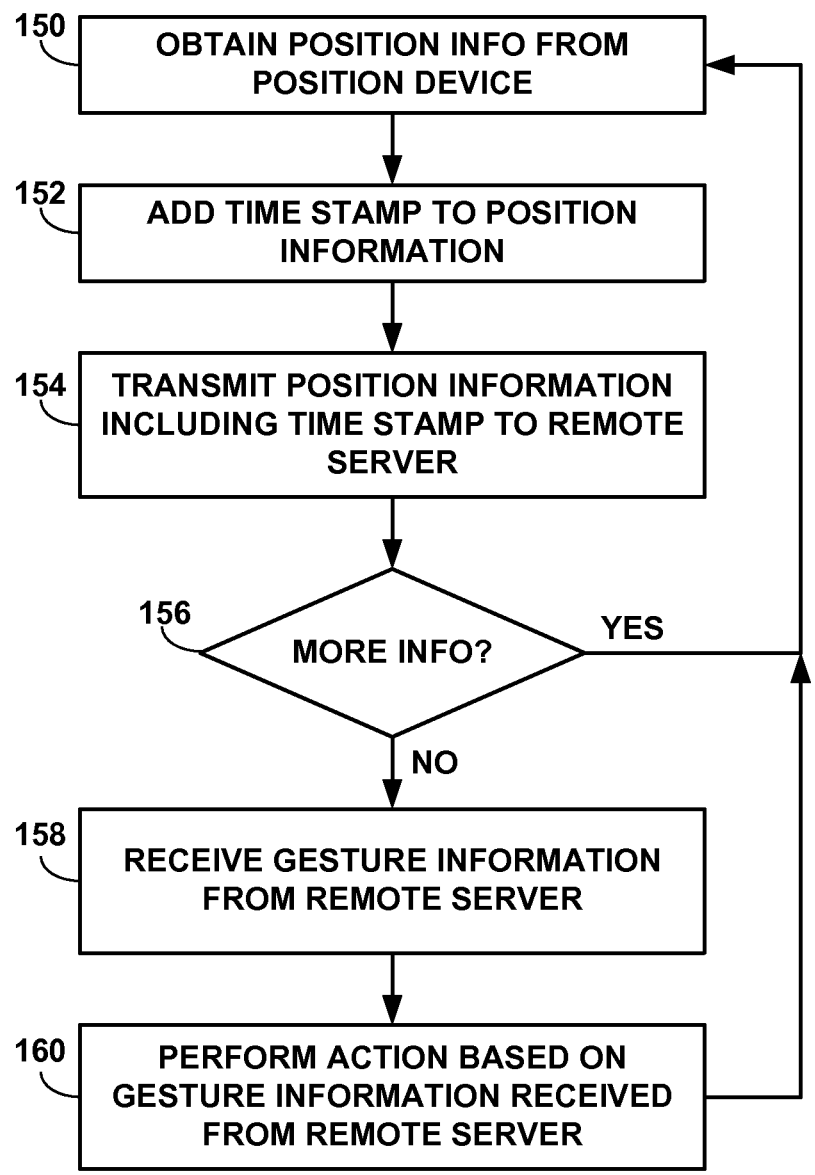
FIG. 9 is a flow diagram illustrating an example process that may be performed by a computing device to transmit position information obtained during a gesture to a remote server and receive gesture information from the remote server.

FIG. 9 is a flow diagram illustrating an example process that may be performed by a computing device (e.g., computing device 12) to transmit position information (e.g., position information 26) obtained during a gesture to a networked device (e.g., remote server 18) and receive gesture information from the networked device. The process of FIG. 9 will be described below with respect to processor 40, but other processors, modules, applications, or any combination thereof, may perform the acts attributed to processor 40. The example process of FIG. 9 may be similar to the process of FIG. 7; however, computing device 12 may employ remote server 18 to define the gesture input and compare the gesture input to predefined gestures.

Using short-range communication device 54 (e.g., an NFC device), processor 40 may obtain position information 26 from a position device 24 when computing device 12 is moved in a gesture proximate to array 22 (150). In response to obtaining position information 26, processor 40 may add a time stamp to the position information as at least a portion of sequence information (152). Alternatively, an incrementing numeral may be used to track the order of position information (and position devices) of the gesture made by the user. Processor 40 may then command network interface 44 to transmit the obtained position information and the time stamp (e.g., an indication of the order in which position information was obtained for the gesture) to remote server 18 (154).

Position information 26 obtained from position devices 24 may include coordinates and/or a URL that indicates the position of each respective position device 24 within array 22. In this manner, transmission of the position information to remote server 18 may include a hypertext transfer protocol (HTTP) request to remote server 18 using the URL. As described herein, processor 40 may add the time stamp to the URL such that a single URL includes the position information and the sequence information.

If processor 40 identifies that there is more position information 26 from another position device ("YES" branch of block 156), processor may again obtain position information (150). Processor 40 may determine that there is more position information by detecting another position device, detecting that computing device 12 is still moving, or continuing until a time period for obtaining information elapses. In response to determining that there is no more position information to obtain ("NO" branch of block 156), processor 40 may receive gesture information from remote server 18 (158). In some examples, processor 40 may transmit an indication to remote server 18 that the gesture has been completed to prompt remote server 18 to define the gesture input and identify the action and/or information of the gesture information.

In response to receiving the gesture information, processor 40 may perform one or more actions based on the gesture information received from remote server 18 (160). In some examples, gesture information may include information that processor 40 may present to the user via user interface 40. Processor 40 may then continue to obtain position information for additional gestures (150). In alternative processes of FIG. 9, processor 40 and remote server 18 may share the operations described herein. Therefore, data may be transmitted between computing device 12 and remote server 18 in any combination to facilitate the operations described herein. For example, computing device 12 may employ remote server 18 to calculate detected movements of computing device 12, refine gesture inputs based on the detected movement, or even determine an action based on a combination of an image and a gesture input.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
    receiving, by a computing device, an initiation input indicative of a command to obtain position information;
    during movement of the computing device with respect to an array of position devices and while receiving the initiation input, obtaining, by the computing device and from a near-field communication module operatively coupled to the computing device, the position information from the array using near-field communication, wherein the position information identifies unique positions of respective position devices within the array;
    determining, by the computing device, sequence information associated with the position information, wherein the sequence information is representative of an order in which the position information was obtained from each position device within the array;
    responsive to obtaining the position information from a first position device of the array of position devices, determining, by the computing device and based on input from a sensor different than the near-field communication module, the movement of the computing device during a time period that includes a time when the position information was obtained from the array of position devices; and
    performing, by the computing device, an action based at least in part on each of the position information, the sequence information, and the determined movement, wherein the position information, the sequence information, and the determined movement are representative of a gesture input.

2. The method of claim 1, further comprising:
    refining, based at least in part on the determined movement, at least one of a shape or a length of the gesture input represented by the position information and the sequence information.

3. The method of claim 1, further comprising:
    transmitting, by the computing device, the position information, the sequence information, and the determined movement to a networked device via a network; and
    receiving, by the computing device, gesture information from the networked device based at least in part on the position information, the sequence information, and the determined movement, wherein the gesture information comprises a command to perform the action.

4. The method of claim 3, further comprising:
    generating at least one uniform resource locator representative of the position information from at least one of the position devices in the array and at least a portion of the sequence information.

5. The method of claim 1, wherein determining the sequence information comprises adding a time stamp to the position information that indicates when each portion of the position information was obtained from each respective position device.

6. The method of claim 1, further comprising:
    capturing, by the computing device, an image of a printed graphic associated with the array; and
    selecting, by the computing device, the action based at least in part on the gesture input and the captured image.

7. The method of claim 1, further comprising:
    presenting an image on a display operatively coupled to the computing device prior to obtaining the position information; and
    selecting, by the computing device, the action based at least in part on the gesture input and the image.

8. The method of claim 1, further comprising:
    responsive to no longer receiving the initiation input, terminating the obtaining of the position information.

9. The method of claim 1, wherein:
    receiving the initiation input comprises receiving a first initiation input and a second initiation input;
    obtaining the position information comprises:
        obtaining a first set of position information from a first subset of the array of position devices in response to receiving the first initiation input; and
        obtaining a second set of position information from a second subset of the array of position devices in response to receiving the second initiation input, and the method further comprising:
defining the gesture input based on the first set of position information and the second set of position information.

10. The method of claim 1, wherein the gesture input comprises one of a question mark, a plus sign, a minus sign, a checkmark, a number, or a letter.

11. The method of claim 1, wherein the computing device is a mobile device.

12. The method of claim 1, wherein determining the movement of the computing device comprises determining, based on the input from the sensor, the movement of the computing device between a first known position and a second known position, wherein each of the first known position and the second known position correspond to a position of a respective position device of the array of position devices.

13. The method of claim 1, wherein obtaining the position information from the array comprises obtaining the position information from a first position device of the array, the method further comprising:
responsive to obtaining the position information from the first position device, changing a detection rate of the sensor from a first detection rate to a second detection rate.

14. The method of claim 1, wherein obtaining the position information comprises determining, by the computing device and based at least in part on a signal strength of the position information, a location of the computing device.

15. A non-transitory computer-readable storage medium encoded with instructions that cause one or more processors of a computing device to perform operations comprising:
receive, from an input device of the computing device, an indication of an initiation input that indicates a command to obtain position information;
during movement of the computing device with respect to an array of position devices and while the input device receives the initiation input, obtaining, from a near-field communication module operatively coupled to the computing device, the position information from the array using near-field communication, wherein the position information identifies unique positions of respective position devices within the array;
determining sequence information associated with the position information, wherein the sequence information is representative of an order in which the position information was obtained from each position device within the array;
responsive to obtaining the position information from a first position device of the array of position devices, determining, based on input from a sensor different than the near-field communication module, the movement of the computing device during a time period that includes a time when the position information was obtained from the array of position devices; and
performing an action based at least in part on each of the position information, the sequence information, and the determined movement, wherein the position information, the sequence information, and the determined movement are representative of a gesture input.

16. The non-transitory computer-readable storage medium of claim 15, further comprising instructions that cause one or more processors of the computing device to perform operations comprising:
refining, based at least in part on the determined movement, at least one of a shape or a length of the gesture input represented by the position information and the sequence information.

17. The non-transitory computer-readable storage medium of claim 15, further comprising instructions that cause one or more processors of the computing device to perform operations comprising:
transmitting the position information, the sequence information, and the determined movement to a networked device via a network; and
receiving gesture information from the networked device based at least in part on the position information, the sequence information, and the determined movement, wherein the gesture information comprises a command to perform the action.

18. The non-transitory computer-readable storage medium of claim 15, further comprising instructions that cause one or more processors of the computing device to perform operations comprising:
responsive to the input device no longer receiving the initiation input, terminating the obtaining of the position information.

19. The non-transitory computer-readable storage medium of claim 15, wherein:
the instructions that cause one or more processors of the computing device to perform operations comprising receiving the initiation input comprises instructions that cause one or more processors of the computing device to perform operations comprising receiving a first initiation input and a second initiation input;
the instructions that cause one or more processors of the computing device to perform operations comprising obtaining the position information comprises instructions that cause one or more processors of the computing device to perform operations comprising:
obtaining a first set of position information from a first subset of the array of position devices in response to receiving the first initiation input; and
obtaining a second set of position information from a second subset of the array of position devices in response to receiving the second initiation input, and the non-transitory computer-readable storage medium further comprising:
instructions that cause one or more processors of the computing device to perform operations comprising defining the gesture input based on the first set of position information and the second set of position information.

20. The non-transitory computer-readable storage medium of claim 15, wherein the gesture input comprises one of a question mark, a plus sign, a minus sign, a checkmark, a number, or a letter.

21. The non-transitory computer-readable storage medium of claim 15, wherein the computing device is a mobile device.

22. A mobile computing device comprising:
an input device configured to receive an initiation input indicative of a command to obtain position information;
a near-field communication module configured to, during movement of the mobile computing device with respect to an array of position devices and while the input device receives the initiation input, obtain the position information from the array using near-field communication, wherein the position information identifies unique positions of respective position devices within the array;
one or more processors configured to determine sequence information associated with the position information, wherein the sequence information is representative of an order in which the position information was obtained from each position device within the array; and a sensor configured to determine the movement of the mobile computing device during a time period that includes a time when the position information was obtained from the array of position devices, wherein the sensor is different than the near-field communication module, and wherein the sensor is configured to determine the movement of the mobile computing device in response to obtaining the position information from a first position device of the array of position devices, wherein the one or more processors are configured to perform an action based at least in part on each of the position information, the sequence information, and the determined movement, wherein the position information, the sequence information, and the determined movement are representative of a gesture input.

23. The mobile computing device of claim 22, wherein the near-field communication module is further configured to terminate the obtaining of the position information in response to the input device no longer receiving the initiation input.

* * * * *